US012444857B2

(12) United States Patent
Komura et al.

(10) Patent No.: US 12,444,857 B2
(45) Date of Patent: Oct. 14, 2025

(54) ANTENNA DEVICE AND ANTENNA UNIT

(71) Applicant: Murata Manufacturing Co., Ltd., Kyoto (JP)

(72) Inventors: Ryo Komura, Kyoto (JP); Masahiro Izawa, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 195 days.

(21) Appl. No.: 18/448,506

(22) Filed: Aug. 11, 2023

(65) Prior Publication Data

US 2023/0387603 A1 Nov. 30, 2023

Related U.S. Application Data

(63) Continuation of application No. PCT/JP2022/004870, filed on Feb. 8, 2022.

(30) Foreign Application Priority Data

Mar. 5, 2021 (JP) ................................ 2021-035559

(51) Int. Cl.
*H01Q 19/02* (2006.01)
*H01Q 1/08* (2006.01)
(Continued)

(52) U.S. Cl.
CPC ............ *H01Q 19/02* (2013.01); *H01Q 1/085* (2013.01); *H01Q 1/2291* (2013.01); *H01Q 1/48* (2013.01)

(58) Field of Classification Search
None
See application file for complete search history.

(56) References Cited

U.S. PATENT DOCUMENTS 5,121,127 A * 6/1992 Toriyama ................ H01Q 5/40 343/700 MS
6,181,281 B1 1/2001 Desclos et al.
(Continued)

FOREIGN PATENT DOCUMENTS

JP H01-189208 A 7/1989
JP H03-270304 A 12/1991
(Continued)

OTHER PUBLICATIONS

International Search Report for PCT/JP2022/004870 dated Apr. 26, 2022.

*Primary Examiner* — Dameon E Levi
*Assistant Examiner* — Anh N Ho
(74) *Attorney, Agent, or Firm* — McDonald Hopkins LLC

(57) ABSTRACT

An antenna device includes: a ground electrode plate; one or more first radiating electrode plates which face the ground electrode plate; a second radiating electrode plate which lies between the ground electrode plate and the one or more first radiating electrode plates; one or more first feeder lines which are connected to the one or more first radiating electrode plates; a second feeder line which is not connected to the one or more first feeder lines but is connected to the second radiating electrode plate; and a ground line which does not connect the one or more first radiating electrode plates to the ground electrode plate but connects the second radiating electrode plate to the ground electrode plate. The one or more first radiating electrode plates lie inside the second radiating electrode plate as viewed from a thickness direction of the ground electrode plate.

13 Claims, 13 Drawing Sheets

(51) Int. Cl.
*H01Q 1/22* (2006.01)
*H01Q 1/48* (2006.01)

(56) References Cited

U.S. PATENT DOCUMENTS

| | | | | |
|---|---|---|---|---|
| 2003/0146872 | A1* | 8/2003 | Kellerman | H01Q 9/0414 343/700 MS |
| 2004/0004571 | A1 | 1/2004 | Adachi et al. | |
| 2005/0140549 | A1 | 6/2005 | Leelaratne | |
| 2006/0097924 | A1* | 5/2006 | Yegin | H01Q 5/40 343/700 MS |
| 2009/0128442 | A1* | 5/2009 | Fujita | H01Q 5/385 343/907 |
| 2018/0358701 | A1* | 12/2018 | Gimersky | H01Q 9/0414 |
| 2019/0131689 | A1 | 5/2019 | Park et al. | |
| 2019/0165476 | A1* | 5/2019 | Hong | H01Q 21/065 |
| 2019/0267697 | A1* | 8/2019 | Quinlan | H01Q 1/36 |
| 2021/0098894 | A1* | 4/2021 | Haviv | H01Q 21/062 |
| 2021/0126372 | A1* | 4/2021 | Duan | H01Q 5/307 |

FOREIGN PATENT DOCUMENTS

| | | | |
|---|---|---|---|
| JP | 2000-165134 | A | 6/2000 |
| JP | 2004-007559 | A | 1/2004 |
| JP | 2005-513844 | A | 5/2005 |

* cited by examiner

ANTENNA DEVICE AND ANTENNA UNIT

CROSS REFERENCE TO RELATED APPLICATION

This is a continuation of International Application No. PCT/JP2022/004870 filed on Feb. 8, 2022 which claims priority from Japanese Patent Application No. 2021-035559 filed on Mar. 5, 2021. The contents of these applications are incorporated herein by reference in their entireties.

BACKGROUND ART

Technical Field

The present disclosure relates to an antenna device and an antenna unit.

Patent Document 1 discloses a high-bandwidth multi-band antenna as an antenna device. The antenna of Patent Document 1 includes a grounded patch member, a further patch member which is arranged substantially parallel to and spaced apart from the grounded patch member and is electrically connected by a radiating element, and a feedline which is capacitively coupled to the further patch member.

Patent Document 1: Japanese Unexamined Patent Application Publication (Translation of PCT Application) No. 2005-513844

BRIEF SUMMARY

The antenna of Patent Document 1 has a three-dimensional structure, and installation of the antenna itself needs much space (a large volume). An antenna may grow further in size depending on a frequency used by the antenna. For this reason, if the antenna of Patent Document 1 is used, it may be hard to secure a space for other antennas in a housing of equipment, which results in an inability to provide a plurality of antennas.

The present disclosure provides an antenna device and an antenna unit which allow provision of a plurality of antennas in a small space.

An antenna device according to an aspect of the present disclosure includes: a ground electrode plate; one or more first radiating electrode plates which face the ground electrode plate; a second radiating electrode plate which lies between the ground electrode plate and the one or more first radiating electrode plates; one or more first feeder lines which are connected to the one or more first radiating electrode plates; a second feeder line which is not connected to the one or more first feeder lines but is connected to the second radiating electrode plate; and a ground line which does not connect the one or more first radiating electrode plates to the ground electrode plate but connects the second radiating electrode plate to the ground electrode plate. The one or more first radiating electrode plates lie inside the second radiating electrode plate as viewed from a thickness direction of the ground electrode plate.

An antenna unit according to an aspect of the present disclosure includes: one or more first radiating electrode plates; a second radiating electrode plate which faces the one or more first radiating electrode plates; a first feed portion for connecting one or more first feeder lines to the one or more first radiating electrode plates; a second feed portion for connecting a second feeder line to the second radiating electrode plate; and a ground portion for grounding the second radiating electrode plate. The one or more first radiating electrode plates lie inside the second radiating electrode plate as viewed from a direction in which the one or more first radiating electrode plates and the second radiating electrode plate face.

The aspects of the present disclosure allow provision of a plurality of antennas in a small space.

DETAILED DESCRIPTION

Figure 1:
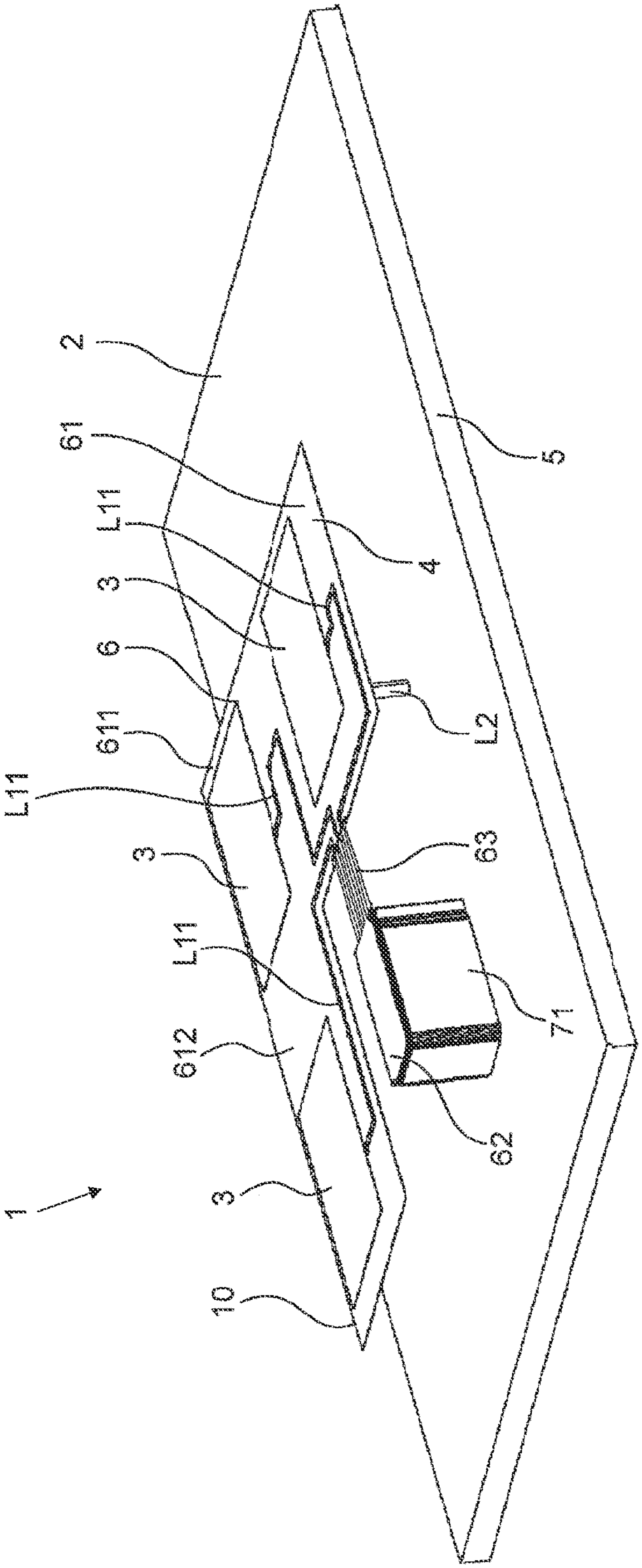
FIG. 1 is a perspective view of an example of a configuration of an antenna device according to a first embodiment.

Embodiments will be described below in detail with appropriate reference to the drawings. A positional relationship, such as up, down, left, and right, is based on positional relationships shown in the drawings unless otherwise specified. The drawings to be described in the following embodiments are schematic drawings, and the ratios of the sizes and thicknesses of the constituent elements in each drawing do not always reflect actual dimensional ratios. Dimensional ratios of elements are not limited to ratios shown in the drawings.

1. EMBODIMENTS

1.1 First Embodiment

1.1.1 Overview

Figure 2:
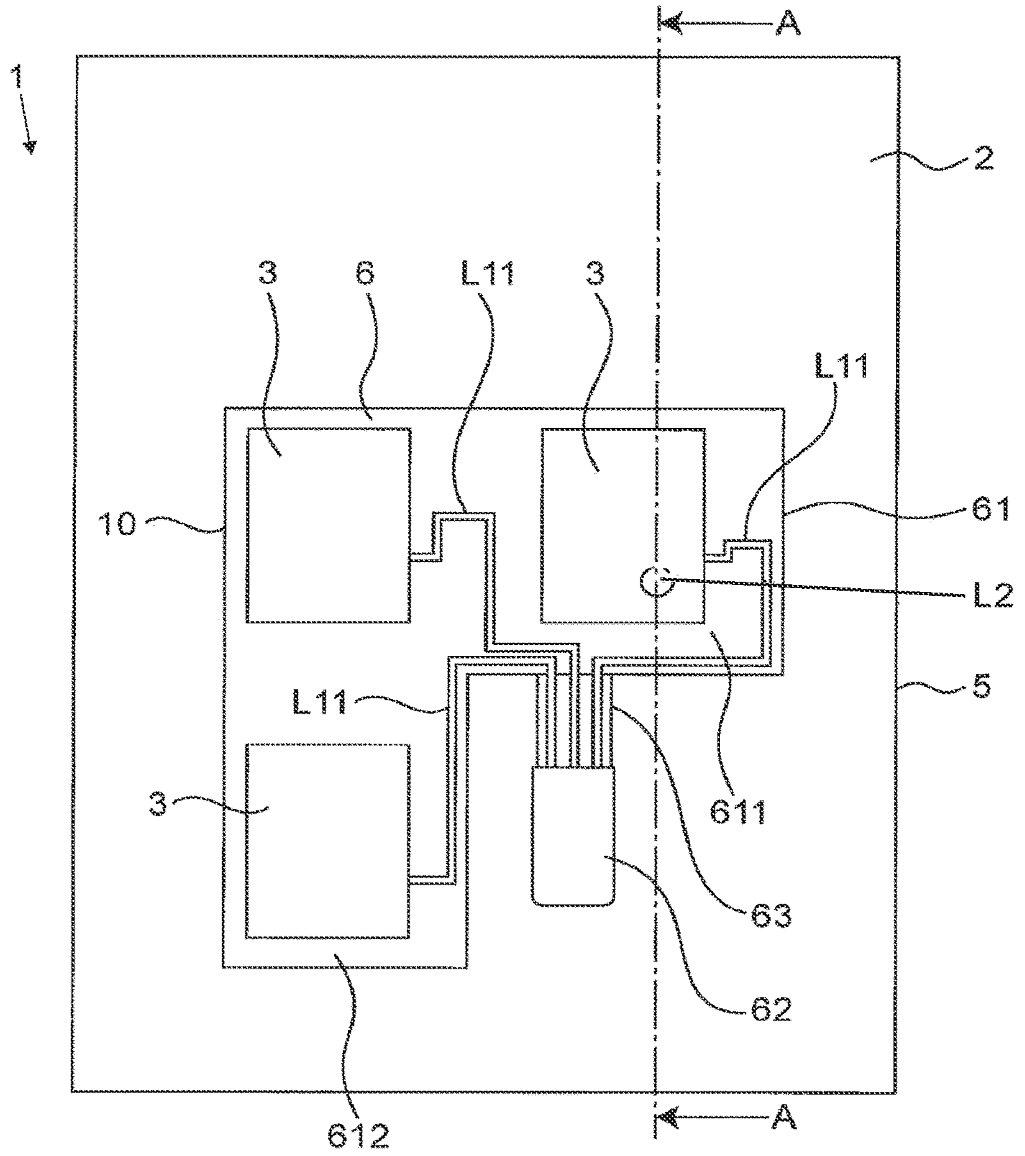
FIG. 2 is a plan view of the antenna device in FIG. 1.
Figure 3:
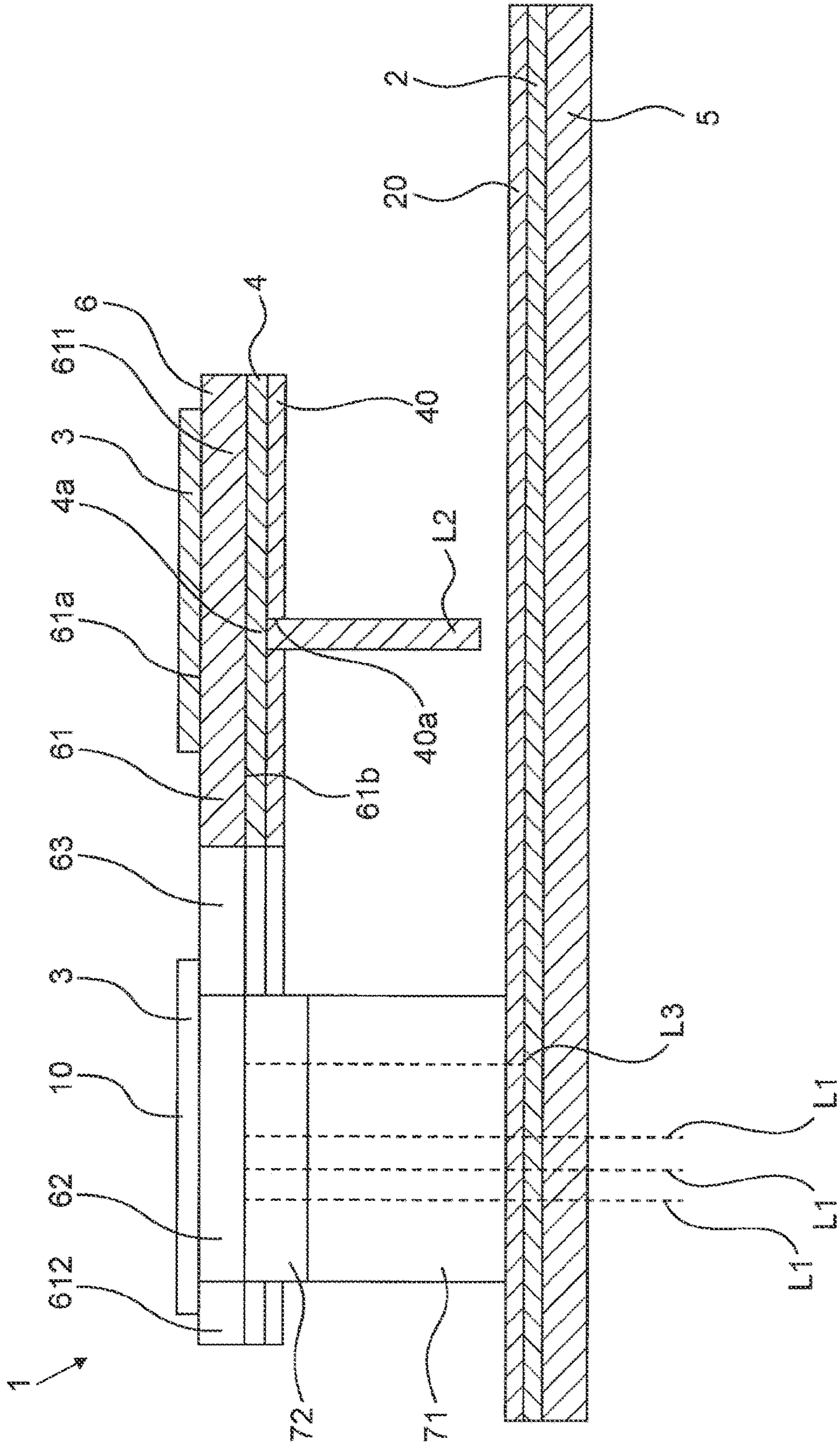
FIG. 3 is a sectional view taken along line A-A in FIG. 2.

FIGS. 1 to 3 show an antenna device 1 according to a first embodiment. FIG. 1 is a perspective view of an example of a configuration of the antenna device 1. FIG. 2 is a plan view of the antenna device 1. FIG. 3 is a sectional view taken along line A-A in FIG. 2.

As shown in FIG. 1, the antenna device 1 includes a ground electrode plate 2, one or more (three in the shown example) first radiating electrode plates 3 which face the ground electrode plate 2, and a second radiating electrode plate 4 which lies between the ground electrode plate 2 and the one or more first radiating electrode plates 3. As shown in FIGS. 1 and 2, the antenna device 1 includes one or more (three in the shown example) first feeder lines L1 which are connected to the one or more first radiating electrode plates 3 and a second feeder line L2 which is not connected to the one or more first feeder lines L1 but is connected to the second radiating electrode plate 4. As shown in FIG. 3, the antenna device 1 includes a ground line L3 which does not connect the one or more first radiating electrode plates 3 to the ground electrode plate 2 but connects the second radiating electrode plate 4 to the ground electrode plate 2. The one or more first radiating electrode plates 3 lie inside the second radiating electrode plate 4 as viewed from a thickness direction of the ground electrode plate 2.

As shown in FIG. 3, in the antenna device 1, the second radiating electrode plate 4 faces the ground electrode plate 2 and is connected to the ground electrode plate 2 via the ground line L3. The second feeder line L2 is connected to the second radiating electrode plate 4. The second radiating electrode plate 4 and the ground electrode plate 2 constitute a planar inverted-F antenna (PIFA). Meanwhile, the one or more (three in the shown example) first radiating electrode plates 3 face the second radiating electrode plate 4. The ground line L3 does not connect the one or more first radiating electrode plates 3 to the ground electrode plate 2 but connects the second radiating electrode plate 4 to the ground electrode plate 2. The second radiating electrode plate 4 functions as a ground for the one or more (three in the shown example) first radiating electrode plates 3. Thus, the first radiating electrode plates 3 and the second radiating electrode plate 4 constitute planar antennas (for example, patch antennas). That is, in the antenna device 1, the planar inverted-F antenna and the planar antennas share the second radiating electrode plate 4. In other words, the second radiating electrode plate 4 doubles as a radiating electrode plate of the planar inverted-F antenna and a ground electrode plate of the planar antennas.

In the antenna device 1, each planar antenna is constructed using the second radiating electrode plate 4 as a constituent of the planar inverted-F antenna. The first radiating electrode plates 3 that constitute the planar antennas together with the second radiating electrode plate 4 lie inside the second radiating electrode plate 4 as viewed from the thickness direction of the ground electrode plate 2. It is thus possible to provide planar antennas without necessarily increasing the size (planar size) of the planar inverted-F antenna composed of the second radiating electrode plate 4 and the ground electrode plate 2. As described above, the antenna device 1 according to the present embodiment allows provision of a plurality of antennas (a planar inverted-F antenna and planar antennas) in a small space.

1.1.2 Details

The antenna device 1 according to the present embodiment will be further described below in detail with reference to the drawings.

As shown in FIG. 1, the antenna device 1 includes the ground electrode plate 2, the three first radiating electrode plates 3, and the second radiating electrode plate 4. The ground electrode plate 2, the three first radiating electrode plates 3, and the second radiating electrode plate 4 are used in wireless transmission or reception.

As shown in FIGS. 1 to 3, the three first radiating electrode plates 3 face the ground electrode plate 2. The second radiating electrode plate 4 lies between the ground electrode plate 2 and the three first radiating electrode plates 3. In other words, the ground electrode plate 2 and the three first radiating electrode plates 3 are on the opposite sides of the second radiating electrode plate 4 from each other.

Each of the first radiating electrode plates 3 constitutes a planar antenna together with the second radiating electrode plate 4. As shown in FIGS. 1 to 3, each first radiating electrode plate 3 is a plate-like electrode. Each first radiating electrode plate 3 has, for example, a rectangular shape. The shape of the first radiating electrode plate 3 is set in accordance with a frequency range for wireless communication which uses the planar antennas composed of the first radiating electrode plates 3 and the second radiating electrode plate 4. In the present embodiment, the first radiating electrode plates 3 correspond to a frequency range for UWB-based wireless communication.

The second radiating electrode plate 4 constitutes a planar antenna together with each of the first radiating electrode plates 3. Additionally, the second radiating electrode plate 4 constitutes a planar inverted-F antenna together with the ground electrode plate 2. The second radiating electrode plate 4 is a plate-like electrode. The shape of the second radiating electrode plate 4 is set in accordance with a frequency range for wireless communication which uses the planar inverted-F antenna composed of the second radiating electrode plate 4 and the ground electrode plate 2. In the present embodiment, the second radiating electrode plate 4 corresponds to a frequency range for Wi-Fi-based wireless communication.

As shown in FIG. 3, the antenna device 1 includes the three first feeder lines L1 that are connected to the three first radiating electrode plates 3 and the second feeder line L2 that is not connected to the three first feeder lines L1 but is connected to the second radiating electrode plate 4. The antenna device 1 also includes the ground line L3 that does not connect the first radiating electrode plates 3 to the ground electrode plate 2 but connects the second radiating electrode plate 4 to the ground electrode plate 2. The three first feeder lines L1 and the second feeder line L2 are connected to, for example, an external circuit.

As shown in FIG. 1, the antenna device 1 includes a first substrate 5 at which the ground electrode plate 2 is arranged and a second substrate 6 at which the three first radiating electrode plates 3 and the second radiating electrode plate 4 are arranged. As shown in FIG. 3, the antenna device 1 includes a first connector 71 and a second connector 72 which are removably connected to each other. As will be described later in detail, the first connector 71 and the second connector 72 are provided for electrical connection of the first substrate 5 and the second substrate 6.

In the antenna device 1, the second substrate 6, at which the three first radiating electrode plates 3 and the second radiating electrode plate 4 are arranged, and the second connector 72 constitute an antenna unit 10. The antenna device 1 is obtained by connecting the antenna unit 10 to the first substrate 5, at which the ground electrode plate 2 is arranged. That is, the antenna device 1 is constructed by connecting the second connector 72 of the antenna unit 10 to the first connector 71 arranged at the first substrate 5 to connect the antenna unit 10 to the first substrate 5.

As shown in FIGS. 1 and 2, the ground electrode plate 2 and the first connector 71 are arranged at the first substrate 5. The first substrate 5 has a rectangular shape. As shown in FIG. 3, the ground electrode plate 2 and the first connector 71 are arranged at one surface (an upper surface in FIG. 3 hereinafter referred to as a principal surface) in a thickness direction of the first substrate 5.

The ground electrode plate 2 is a plate-like electrode. A potential of the ground electrode plate 2 is set at a ground potential when the antenna device 1 is used. The ground electrode plate 2 is connected to, for example, a ground of the external circuit. The ground electrode plate 2 covers, for example, the whole of the principal surface of the first substrate 5 except for a portion where the first connector 71 is arranged.

As shown in FIG. 3, the second substrate 6 is arranged spaced apart from the first substrate 5. As shown in FIGS. 1 and 2, the three first radiating electrode plates 3, the second radiating electrode plate 4, and the second connector 72 are arranged at the second substrate 6. As shown in FIG. 3, the three first radiating electrode plates 3 are arranged at a surface (an upper surface in FIG. 3) on the opposite side of the second substrate 6 from the first substrate 5. The second radiating electrode plate 4 is arranged at a surface (a lower surface in FIG. 3) on a side with the first substrate 5 of the second substrate 6.

As shown in FIGS. 1 and 2, the second substrate 6 has an electrode arrangement portion 61, a connector arrangement portion 62, and a joining portion 63.

The three first radiating electrode plates 3 and the second radiating electrode plate 4 are arranged in the electrode arrangement portion 61. More particularly, the three first radiating electrode plates 3 are arranged at a first surface 61*a* (an upper surface in FIG. 3) on the opposite side of the electrode arrangement portion 61 from the first substrate 5. The second radiating electrode plate 4 is arranged at a second surface 61*b* (a lower surface in FIG. 3) on a side with the first substrate 5 of the electrode arrangement portion 61.

As shown in FIGS. 1 and 2, the electrode arrangement portion 61 has an L-shape in plan view. The electrode arrangement portion 61 has a first region 611 and a second region 612. The first region 611 has a rectangular shape. Two first radiating electrode plates 3 are arranged in the first region 611. One first radiating electrode plate 3 is arranged in the second region 612.

As shown in FIG. 2, the two first radiating electrode plates 3 are arranged lined up in a length direction (a left-right direction in FIG. 2) of the first region 611. The second region 612 protrudes from the first region 611 in a direction (an up-down direction in FIG. 2) crossing a direction in which the two first radiating electrode plates 3 arranged in the first region 611 are lined up. More particularly, the second region 612 protrudes from a first end side in the length direction (the left-right direction in FIG. 2) of the first region 611 at a first end in a width direction (the up-down direction in FIG. 2) of the first region 611. The second region 612 has a rectangular shape.

As shown in FIG. 2, the three first radiating electrode plates 3 are arranged at the first surface 61*a* of the electrode arrangement portion 61 so as to be lined up in an L-shape as viewed from the thickness direction of the ground electrode plate 2. As described above, in the antenna device 1, the three first radiating electrode plates 3 are arranged such that two first radiating electrode plates 3 are lined up in each of a first direction (for example, the length direction of the first region 611) and a second direction (for example, the width direction of the first region 611) which are orthogonal to the thickness direction of the ground electrode plate 2 and are orthogonal to each other. This allows detection of an angle of arrival (AoA) in each of the first direction and the second direction.

Figure 4:
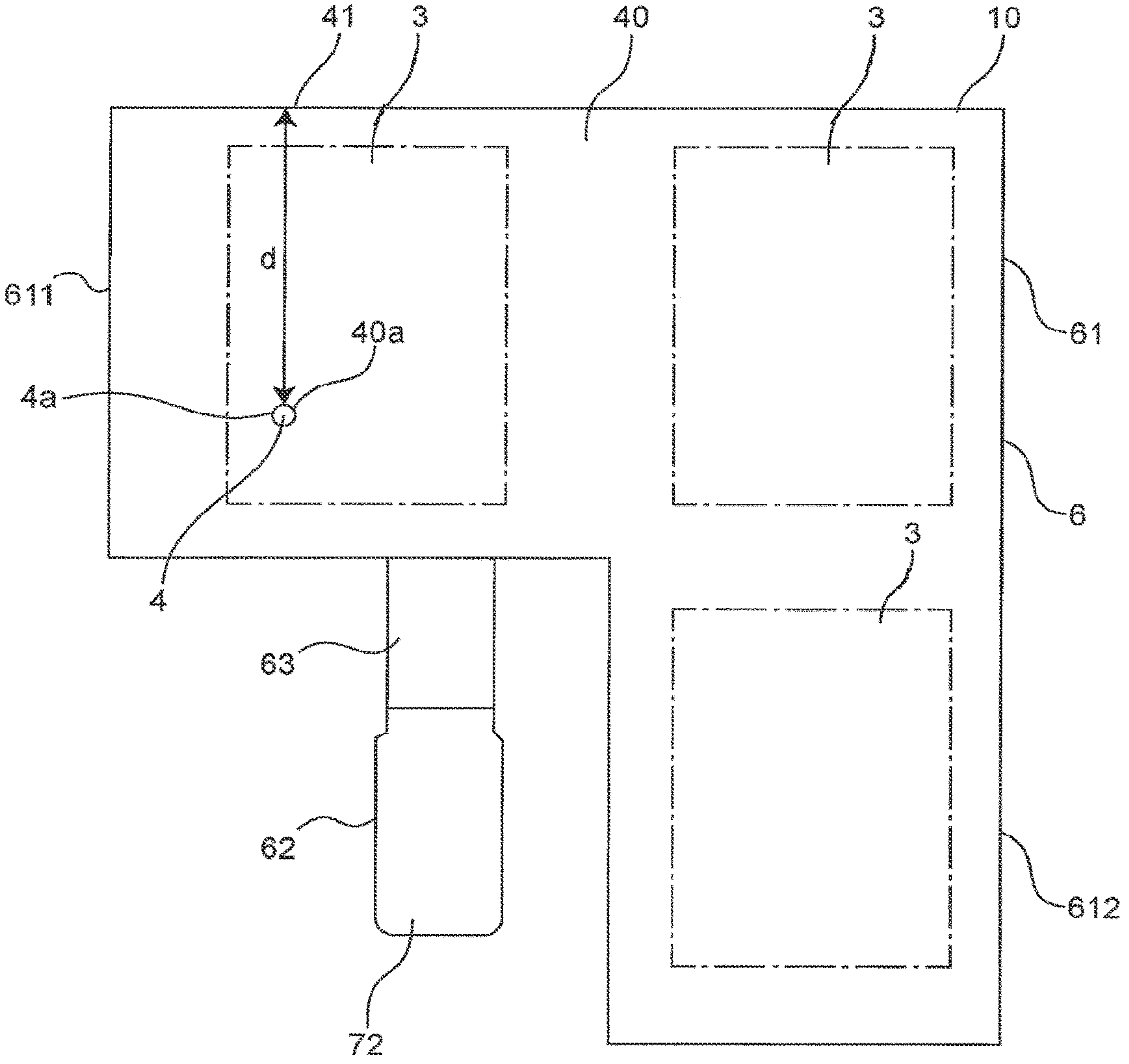
FIG. 4 is a bottom view of a second substrate of the antenna device in FIG. 1.

FIG. 4 is a bottom view of the second substrate 6 of the antenna device 1. As shown in FIG. 4, the second radiating electrode plate 4 is arranged so as to cover the whole of the second surface 61*b* of the electrode arrangement portion 61. For this reason, the three first radiating electrode plates 3 lie inside the second radiating electrode plate 4 as viewed from the thickness direction of the ground electrode plate 2, as shown in FIG. 4.

The second connector 72 is arranged in the connector arrangement portion 62. As shown in FIGS. 1 and 2, the connector arrangement portion 62 is lined up with the second region 612 in a direction in which two first radiating electrode plates 3 arranged in the first region 611 are lined up. Additionally, the connector arrangement portion 62 faces a second end side in the length direction (the left-right direction in FIG. 2) of the first region 611 at the first end in the width direction (the up-down direction in FIG. 2) of the first region 611. The connector arrangement portion 62 has a rectangular shape.

The joining portion 63 joins the electrode arrangement portion 61 and the connector arrangement portion 62. As shown in FIGS. 1 and 2, the joining portion 63 joins the connector arrangement portion 62 and the first region 611. The joining portion 63 has an elongated shape. The joining portion 63 has flexibility. The flexibility of the joining portion 63 facilitates connection of the second connector 72 to the first connector 71 and makes it possible to absorb a dimension error and reliably connect the second connector 72 to the first connector 71.

The first connector 71 is arranged at the first substrate 5 and is connected to the three first feeder lines L1 and the ground line L3. The second connector 72 is arranged at the second substrate 6 and is connected to the three first radiating electrode plates 3 and the second radiating electrode plate 4. For example, the second connector 72 is connected to the three first radiating electrode plates 3 via respective feeder wires L1*l* shown in FIGS. 1 and 2. In the present embodiment, with the connection of the first connector 71 to the second connector 72, the three first feeder lines L1 are connected to the three first radiating electrode plates 3, and the ground line L3 is connected to the second radiating electrode plate 4. In the present embodiment, the second connector 72 constitutes a first feed portion for connecting the three first feeder lines L1 to the three first radiating electrode plates 3 and a ground portion for connecting a ground to the second radiating electrode plate 4. In the present embodiment, the ground portion is used to ground the second radiating electrode plate 4 by connecting the ground line L3 to the second radiating electrode plate 4.

As shown in FIG. 3, the antenna device 1 includes a protective film 20 which protects the ground electrode plate 2 and a protective film 40 which protects the second radiating electrode plate 4. Note that the protective films 20 and 40 are not shown in FIGS. 1 and 2 just for the sake of clarity of the drawings.

The protective film 20 is arranged at a surface on the opposite side of the ground electrode plate 2 from the first substrate 5. The protective film 20 entirely covers the ground electrode plate 2. The protective film 20 has electrical insulation.

The protective film 40 is arranged at a surface on the opposite side of the second radiating electrode plate 4 from the second substrate 6. The protective film 40 entirely covers the second radiating electrode plate 4. The protective film 40 has electrical insulation. In the present embodiment, the protective film 40 has an opening 40*a* which partially exposes the second radiating electrode plate 4, as shown in FIGS. 3 and 4. A region exposed through the opening 40*a* in the second radiating electrode plate 4 constitutes a second feed portion 4*a* for connecting the second radiating electrode plate 4 to the second feeder line L2. The second feed portion 4*a* is a junction of the second feeder line L2 and the second radiating electrode plate 4.

In the present embodiment, the second feeder line L2 is a conductive pin. As shown in FIG. 3, the second feeder line L2 is connected to the second radiating electrode plate 4 by bringing one end of the second feeder line L2 into contact with the second feed portion 4*a* of the second radiating electrode plate 4 through the opening 40*a*. The second feed portion 4*a* defines a feeding point for the planar inverted-F antenna that the second radiating electrode plate 4 constitutes together with the ground electrode plate 2. As described above, the second radiating electrode plate 4 corresponds to a frequency range for Wi-Fi-based wireless communication. A position of the second feed portion 4*a* is set so as to facilitate resonance in the frequency range for Wi-Fi-based wireless communication. More particularly, as shown in FIG. 4, a distance d between the second feed portion 4*a* (that is, the junction of the second feeder line L2 and the second radiating electrode plate 4) and an end portion 41 of the second radiating electrode plate 4 is set in accordance with a frequency used in wireless communication using the second radiating electrode plate 4, as viewed from the thickness direction of the ground electrode plate 2. The end portion 41 here is an end portion of the second radiating electrode plate 4 which lies on the opposite side of the junction (the second feed portion 4*a*) of the second feeder line L2 and the second radiating electrode plate 4 from a junction (the second connector 72) of the ground line L3 and the second radiating electrode plate 4, as viewed from the thickness direction of the ground electrode plate 2. Frequency ranges for Wi-Fi-based wireless communication include a frequency range around 2.4 GHz (for example, 2.4 GHz to 2.5 GHz) and a frequency range around 5 GHz (for example, 5.15 GHz to 5.8 GHz). The distance d is, for example, ¼ of a wavelength corresponding to a frequency range of 5 GHz. That is, the distance d may be ¼ of a wavelength corresponding to a highest frequency range of one or more frequency ranges used in wireless communication using the second radiating electrode plate 4. This configuration allows improvement of characteristics for a highest frequency range of one or more frequencies used in wireless communication using the second radiating electrode plate 4.

1.1.3 Evaluation

As described above, the antenna device 1 includes two types of antennas, the planar antennas (for example, patch antennas) composed of the first radiating electrode plates 3 and the second radiating electrode plate 4 and the planar inverted-F antenna (PIFA) composed of the second radiating electrode plate 4 and the ground electrode plate 2. The planar antennas composed of the first radiating electrode plates 3 and the second radiating electrode plate 4 are used in UWB-based wireless communication, and the planar inverted-F antenna composed of the second radiating electrode plate 4 and the ground electrode plate 2 is used in Wi-Fi-based wireless communication.

Figure 5:
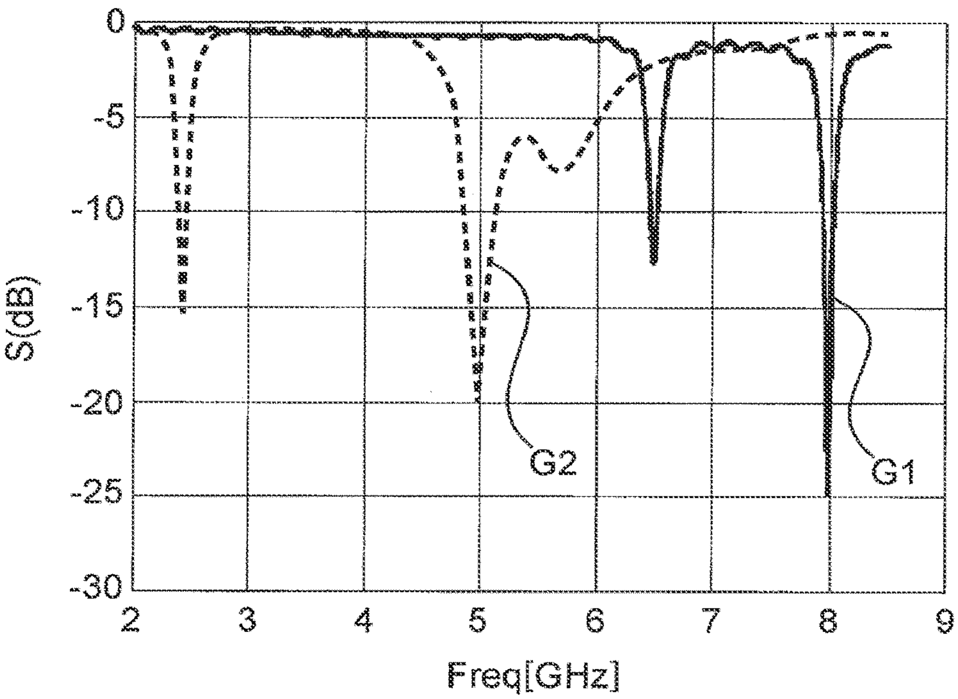
FIG. 5 is a graph of frequency characteristics of the antenna device in FIG. 1.

FIG. 5 is a graph of frequency characteristics of the antenna device 1. The frequency characteristics are evaluated on the basis of an S parameter. G1 denotes a line of an S parameter between input and output ports of the planar antenna composed of each first radiating electrode plate 3 and the second radiating electrode plate 4. G2 denotes a line of an S parameter between input and output ports of the planar inverted-F antenna composed of the second radiating electrode plate 4 and the ground electrode plate 2. As can be seen from FIG. 5, each planar antenna composed of the first radiating electrode plate 3 and the second radiating electrode plate 4 and the planar inverted-F antenna composed of the second radiating electrode plate 4 and the ground electrode plate 2 characteristically resonate in different frequency ranges.

Figure 6:
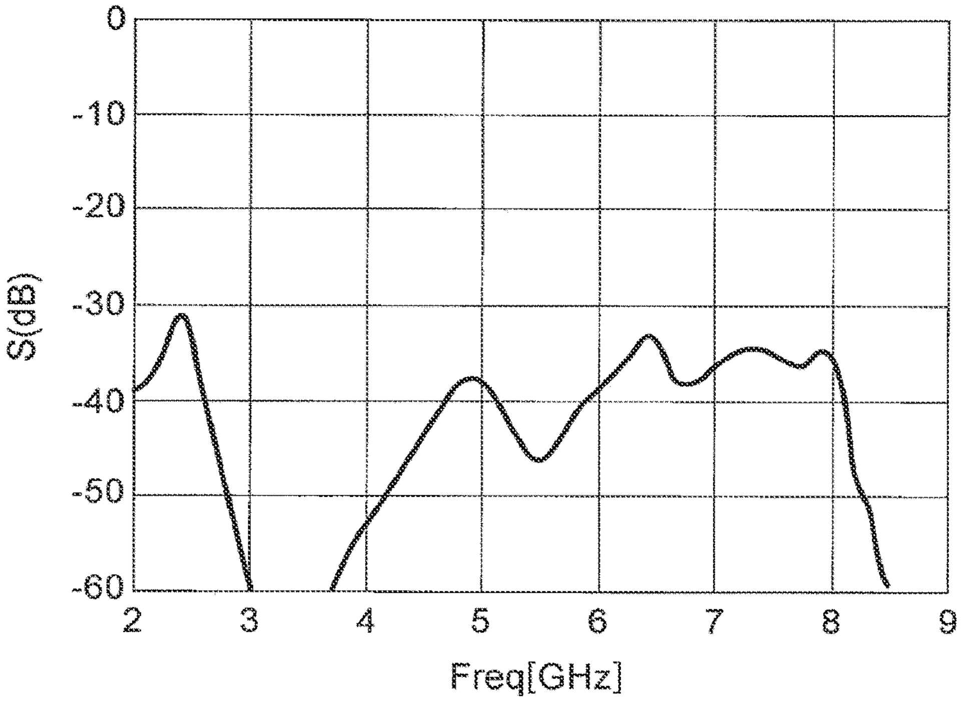
FIG. 6 is a graph of isolation characteristics of the antenna device in FIG. 1.

FIG. 6 is a graph of isolation characteristics of the antenna device 1. The isolation characteristics are represented by a graph of an S parameter between each planar antenna composed of the first radiating electrode plate 3 and the second radiating electrode plate 4 and the planar inverted-F antenna composed of the second radiating electrode plate 4 and the ground electrode plate 2. As can be seen from FIG. 6, isolation between the planar antenna composed of the first radiating electrode plate 3 and the second radiating electrode plate 4 and the planar inverted-F antenna composed of the second radiating electrode plate 4 and the ground electrode plate 2 is sufficiently secured.

1.1.4 Effects Etc.

The antenna device 1 described above includes the ground electrode plate 2, one or more first radiating electrode plates 3 which face the ground electrode plate 2, the second radiating electrode plate 4 that lies between the ground electrode plate 2 and the one or more first radiating electrode plates 3, one or more first feeder lines L1 which are connected to the one or more first radiating electrode plates 3, the second feeder line L2 that is not connected to the one or more first feeder lines L1 but is connected to the second radiating electrode plate 4, and the ground line L3 that does not connect the one or more first radiating electrode plates 3 to the ground electrode plate 2 but connects the second radiating electrode plate 4 to the ground electrode plate 2. The one or more first radiating electrode plates 3 lie inside the second radiating electrode plate 4 as viewed from the thickness direction of the ground electrode plate 2. This configuration allows provision of a plurality of antennas in a small space.

The antenna device 1 includes the first substrate 5, at which the ground electrode plate 2 is arranged, and the second substrate 6, which is arranged spaced apart from the first substrate 5 and at which the one or more first radiating electrode plates 3 and the second radiating electrode plate 4 are arranged. This configuration allows provision of a plurality of antennas in a small space.

In the antenna device 1, the one or more first radiating electrode plates 3 are arranged at the surface on the opposite side of the second substrate 6 from the first substrate 5. The second radiating electrode plate 4 is arranged at the surface on the side with the first substrate 5 of the second substrate 6. This configuration allows provision of a plurality of antennas in a small space.

The antenna device 1 includes the first connector 71 and the second connector 72 that are removably connected to each other. The first connector 71 is arranged at the first substrate 5 and is connected to the one or more first feeder lines L1 and the ground line L3. The second connector 72 is arranged at the second substrate 6 and is connected to the one or more first radiating electrode plates 3 and the second radiating electrode plate 4. According to this configuration, with the connection of the first connector 71 to the second connector 72, the one or more first feeder lines L1 are connected to the one or more first radiating electrode plates 3, and the ground line L3 is connected to the second radiating electrode plate 4. This facilitates assembly of the antenna device 1.

In the antenna device 1, the second substrate 6 has the electrode arrangement portion 61, in which the one or more first radiating electrode plates 3 and the second radiating electrode plate 4 are arranged, the connector arrangement portion 62, in which the second connector 72 is arranged, and the flexible joining portion 63 that joins the electrode arrangement portion 61 and the connector arrangement portion 62. This configuration facilitates assembly of the antenna device 1.

In the antenna device 1, the electrode arrangement portion 61 includes the first region 611, in which at least two first radiating electrode plates 3 are arranged, and the second region 612, which protrudes from the first region 611 in a direction crossing a direction in which at least two first radiating electrode plates 3 arranged in the first region 611 are lined up and in which at least one first radiating electrode plate 3 is arranged. The connector arrangement portion 62 is lined up with the second region 612 in the direction in which the at least two first radiating electrode plates 3 arranged in the first region 611 are lined up. The joining portion 63 joins the connector arrangement portion 62 and the first region 611. This configuration makes it possible to reduce the size of the second substrate 6 while providing a plurality of first radiating electrode plates 3.

In the antenna device 1, the second radiating electrode plate 4 has the end portion 41 on the opposite side of the junction (the second feed portion 4*a*) of the second feeder line L2 and the second radiating electrode plate 4 from the junction (the second connector 72) of the ground line L3 and the second radiating electrode plate 4, as viewed from the thickness direction of the ground electrode plate 2. As viewed from the thickness direction of the ground electrode plate 2, the distance d between the end portion 41 and the junction (the second feed portion 4*a*) of the second feeder line L2 and the second radiating electrode plate 4 is ¼ of a wavelength corresponding to a highest frequency range of one or more frequency ranges used in wireless communication using the second radiating electrode plate 4. This configuration allows improvement of characteristics for a highest frequency range of one or more frequencies used in wireless communication using the second radiating electrode plate 4.

In the antenna device 1, the one or more first radiating electrode plates 3 are arranged such that two or more first radiating electrode plates 3 are lined up in each of the first direction and the second direction which are orthogonal to the thickness direction of the ground electrode plate 2 and orthogonal to each other. This configuration allows detection of an angle of arrival in each of the first direction and the second direction.

In the antenna device 1, the one or more first radiating electrode plates 3 include three first radiating electrode plates 3 which are lined up in an L-shape as viewed from the thickness direction of the ground electrode plate 2. This configuration allows detection of an angle of arrival in each of the first direction and the second direction and achieves reduction in size and reduction in manufacturing costs.

In the antenna device 1, the one or more first radiating electrode plates 3 correspond to a frequency range for UWB-based wireless communication. The second radiating electrode plate 4 corresponds to a frequency range for Wi-Fi-based wireless communication. This configuration allows both UWB-based wireless communication and Wi-Fi-based wireless communication.

The antenna unit 10 described above includes one or more first radiating electrode plates 3, the second radiating electrode plate 4 that faces the one or more first radiating electrode plates 3, a first feed portion (the second connector 72) for connecting one or more first feeder lines L1 to the one or more first radiating electrode plates 3, the second feed portion 4*a* for connecting the second feeder line L2 to the second radiating electrode plate 4, and a ground portion (the second connector 72) for connecting the second radiating electrode plate 4 to the ground. The one or more first radiating electrode plates 3 lie inside the second radiating electrode plate 4 as viewed from a direction in which the one or more first radiating electrode plates 3 and the second radiating electrode plate 4 face. This configuration allows provision of a plurality of antennas in a small space.

1.2 Second Embodiment

Figure 7:
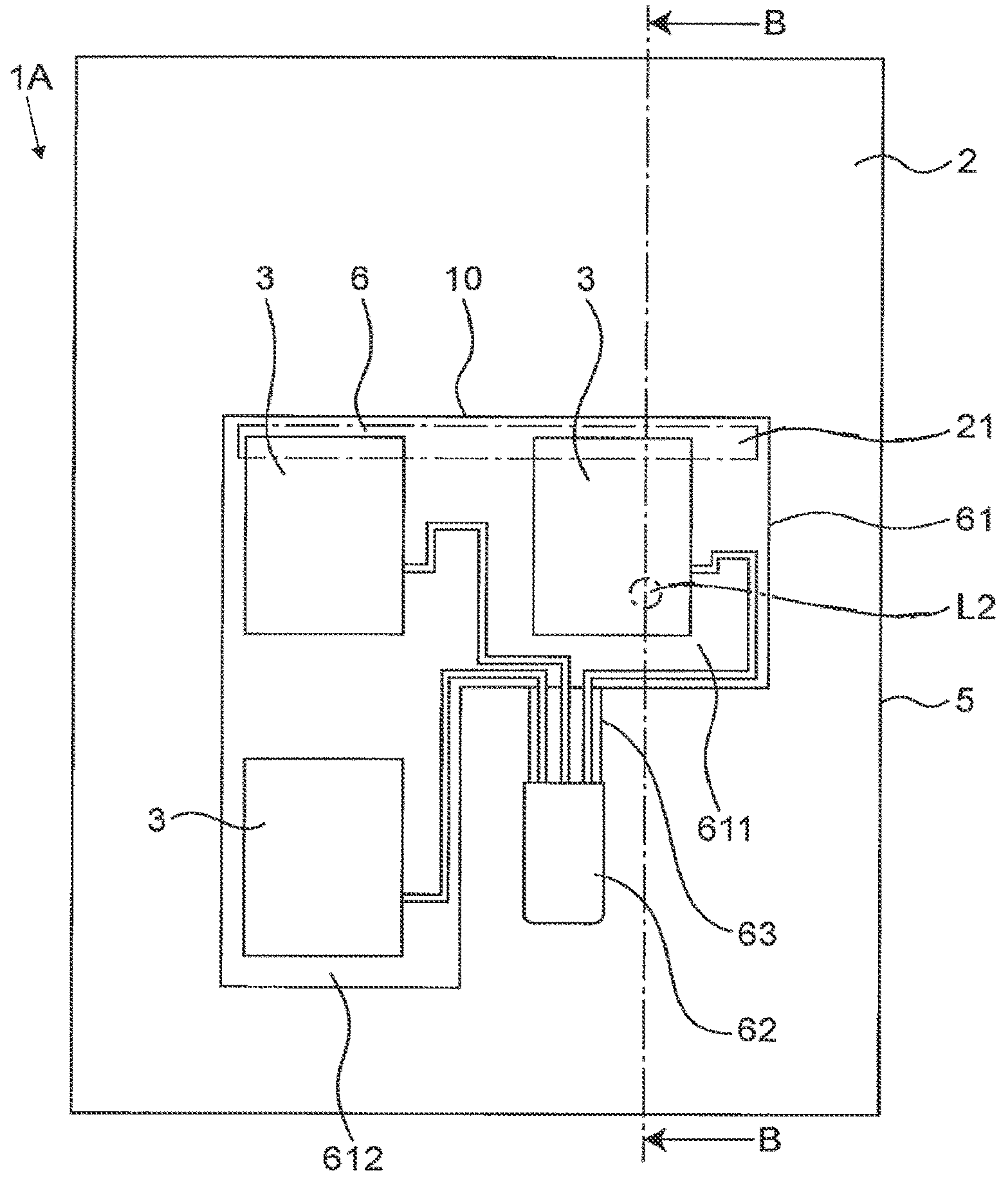
FIG. 7 is a plan view of an example of a configuration of an antenna device according to a second embodiment.
Figure 8:
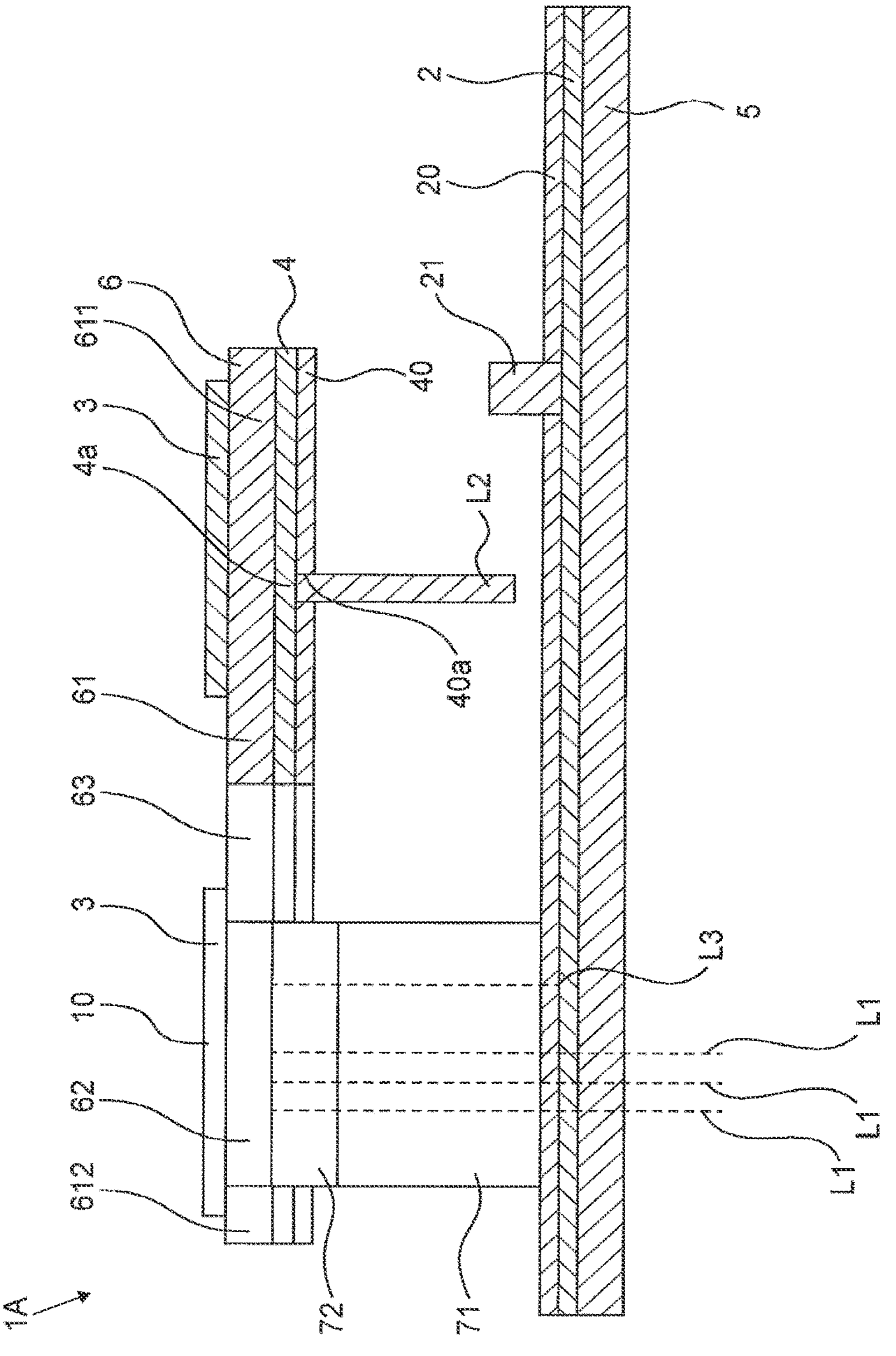
FIG. 8 is a sectional view taken along line B-B in FIG. 7.

FIGS. 7 and 8 show an example of a configuration of an antenna device 1A according to a second embodiment. FIG. 7 is a plan view of the antenna device 1A, and FIG. 8 is a sectional view taken along line B-B in FIG. 7.

As shown in FIGS. 7 and 8, the antenna device 1A is different from the antenna device 1 in that the antenna device 1A includes a protruding portion 21.

The protruding portion 21 is provided for adjustment of a resonant frequency of an antenna (planar inverted-F antenna) which is composed of a second radiating electrode plate 4 and a ground electrode plate 2. The protruding portion 21 extends from the ground electrode plate 2 toward the second radiating electrode plate 4. The protruding portion 21 has conductivity. The protruding portion 21 extends along a length direction of a first region 611 of a second substrate 6. The protruding portion 21 is connected to the ground electrode plate 2, and is set at a ground potential, like the ground electrode plate 2. The protruding portion 21, in particular, lies on the opposite side of a junction (a second feed portion 4*a*) of the second feeder line L2 and the second radiating electrode plate 4 from a junction (a second connector 72) of a ground line L3 and the second radiating electrode plate 4, as viewed from a thickness direction of the ground electrode plate 2. In the second radiating electrode plate 4, a portion on the opposite side of the second feed portion 4*a* from the second connector 72 is a portion which contributes to resonance, and the presence of the protruding portion 21 changes the degree (capacitance) of coupling between the portion contributing to resonance in the second radiating electrode plate 4 and the ground electrode plate 2. For example, increase in height of the protruding portion 21 strengthens coupling between the portion contributing to resonance in the second radiating electrode plate 4 and the ground electrode plate 2 (increases capacitance), which allows reduction in the resonant frequency. Adjustment of the height of the protruding portion 21 allows adjustment of the resonant frequency of the antenna composed of the second radiating electrode plate 4 and the ground electrode plate 2.

Figure 9:
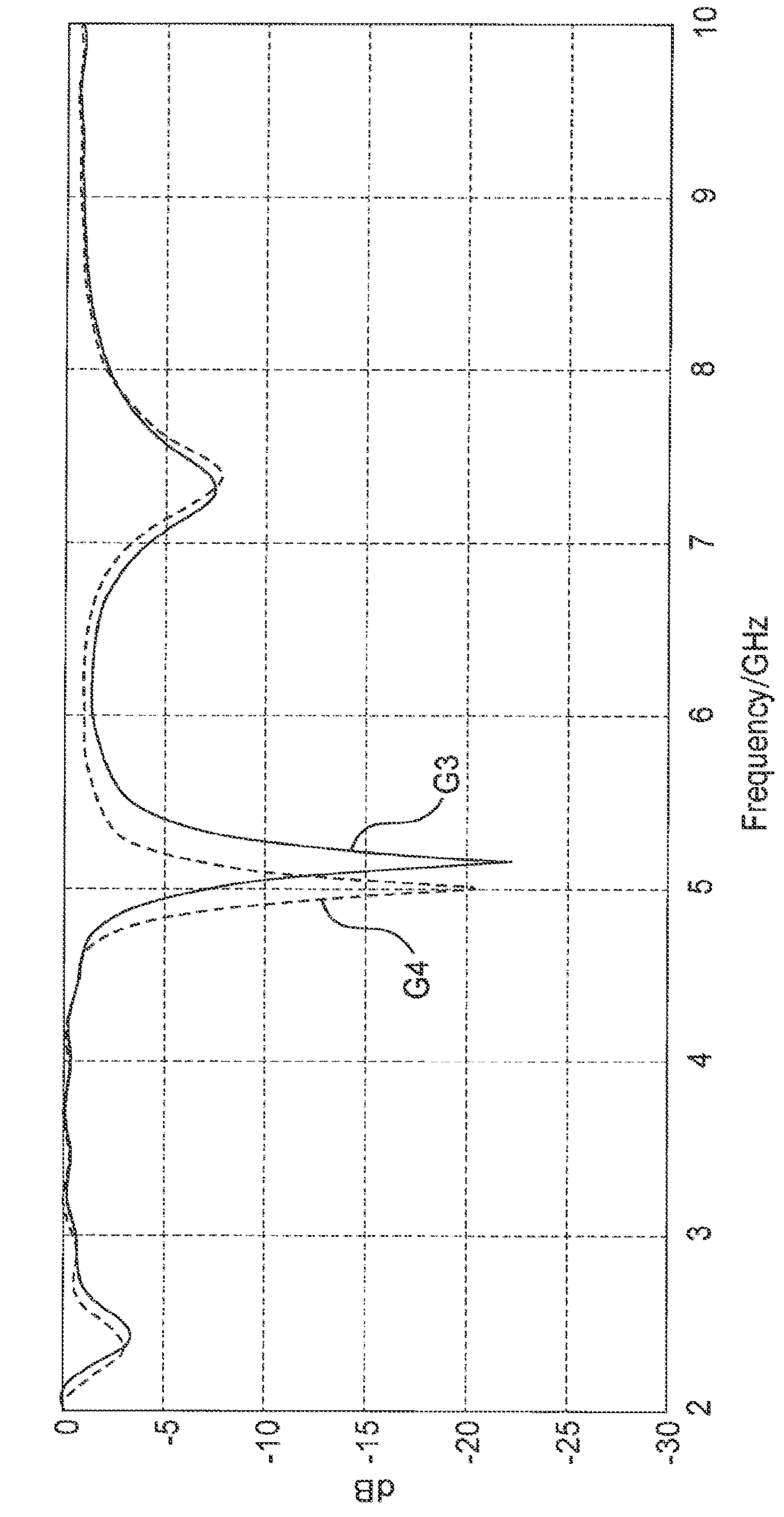
FIG. 9 is a graph for explaining a change in a resonant frequency of the antenna device in FIG. 7.

FIG. 9 is a graph for explaining a change in a resonant frequency of the antenna device 1A. In FIG. 9, G3 denotes frequency characteristics (S parameter) of the antenna device 1 that does not include the protruding portion 21, and G4 denotes frequency characteristics (S parameter) of the antenna device 1A that includes the protruding portion 21. As can be seen from G3 and G4, peak positions are different near 2.4 GHz and near 5 GHz. This indicates that provision of the protruding portion 21 allows adjustment of the resonant frequency of the antenna (planar inverted-F antenna) composed of the second radiating electrode plate 4 and the ground electrode plate 2.

Although the protruding portion 21 is made to protrude from the ground electrode plate 2 at the time of provision of the protruding portion 21, no change has been made to the second radiating electrode plate 4 itself. That is, the size of the second radiating electrode plate 4 is the same. This means that there is no change in a ground state as viewed from antennas which are composed of first radiating electrode plates 3 and the second radiating electrode plate 4. For this reason, even provision of the protruding portion 21 does not affect frequency characteristics of the planar antennas composed of the first radiating electrode plates 3 and the second radiating electrode plate 4.

As has been described above, the antenna device 1A includes the protruding portion 21 extending from the ground electrode plate 2 toward the second radiating electrode plate 4. With this configuration, the protruding portion 21 makes it possible to adjust the resonant frequency of the antenna composed of the second radiating electrode plate 4 and the ground electrode plate 2 without necessarily affecting the frequency characteristics of the antenna composed of the one or more first radiating electrode plates 3 and the second radiating electrode plate 4.

In the antenna device 1A, the protruding portion 21 lies on the opposite side of the junction (the second feed portion 4*a*) of the second feeder line L2 and the second radiating electrode plate 4 from the junction (the second connector 72) of the ground line L3 and the second radiating electrode plate 4 as viewed from the thickness direction of the ground electrode plate 2. This configuration allows increase in the effect of adjustment of the frequency characteristics of the antenna composed of the second radiating electrode plate 4 and the ground electrode plate 2 by the protruding portion 21.

1.3 Third Embodiment

Figure 10:
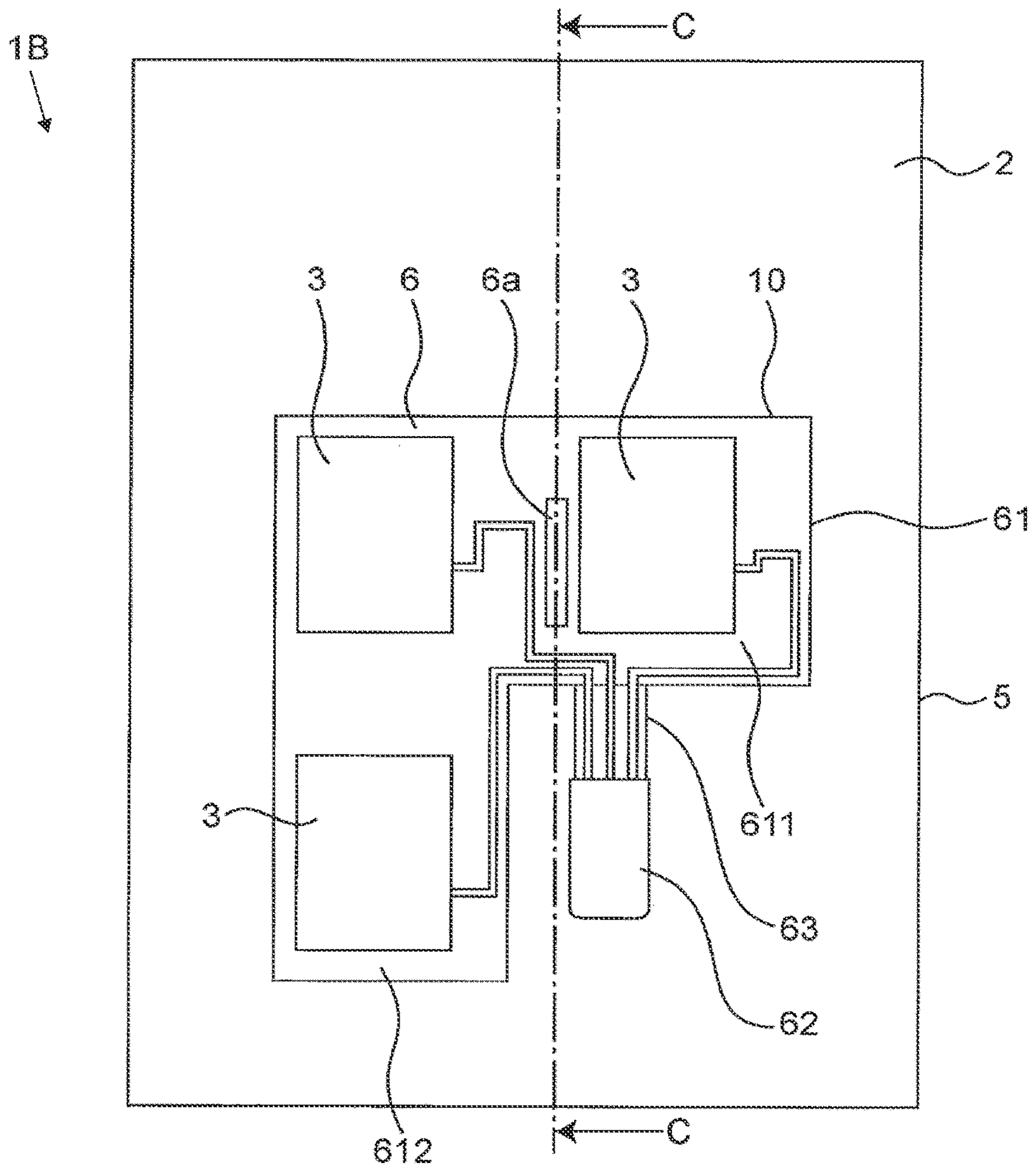
FIG. 10 is a plan view of an example of a configuration of an antenna device according to a third embodiment.
Figure 11:
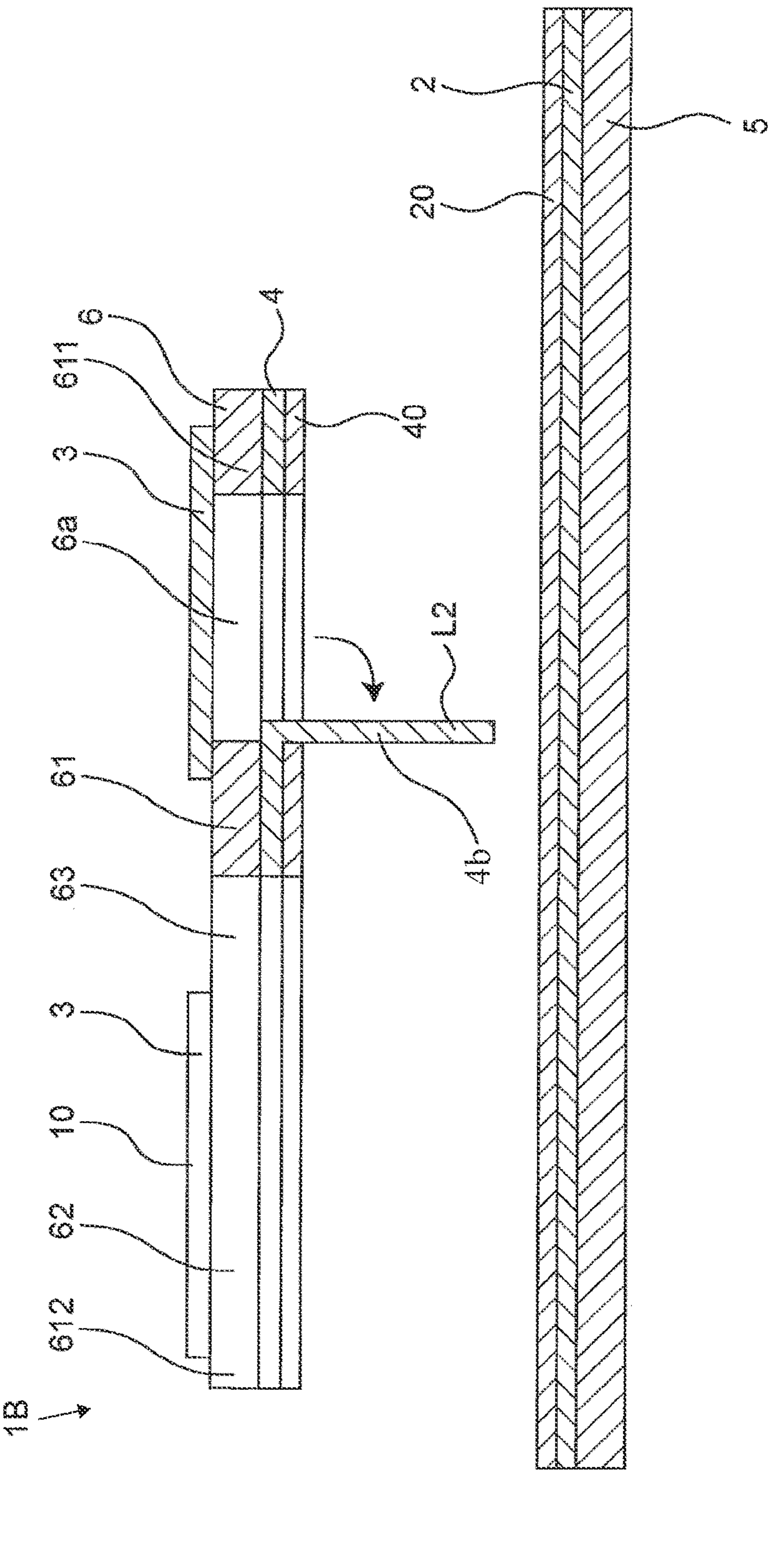
FIG. 11 is a sectional view taken along line C-C in FIG. 10.

FIGS. 10 and 11 show an example of a configuration of an antenna device 1B according to a third embodiment. FIG. 10 is a plan view of the antenna device 1B, and FIG. 11 is a sectional view taken along line C-C in FIG. 10.

As shown in FIGS. 10 and 11, the antenna device 1B is different from the antenna device 1 in a configuration of a second feeder line L2. More particularly, although the second feeder line L2 is a conductive pin separate from the second radiating electrode plate 4 in the antenna device 1, the second feeder line L2 is continuous and integral with a second radiating electrode plate 4 in the antenna device 1B. That is, there is no seam between the second feeder line L2 and the second radiating electrode plate 4, and the second feeder line L2 and the second radiating electrode plate 4 are a one-piece component. In the present embodiment, the second feeder line L2 is formed by bending a part 4*b* of a plate member which constitutes the second radiating electrode plate 4.

In the present embodiment, a second substrate 6 includes an opening 6*a*, as shown in FIGS. 10 and 11. The opening 6*a* has, for example, a rectangular shape. The opening 6*a* lies, for example, between two first radiating electrode plates 3 in a first region 611 of an electrode arrangement portion 61 of the second substrate 6. The second feeder line L2 can be formed by arranging the plate member constituting the second radiating electrode plate 4 in the electrode arrangement portion 61 of the second substrate 6 and then bending the part 4*b* of the plate member using the opening 6*a* of the second substrate 6. In this manner, the second feeder line L2 is formed continuously and integrally with the second radiating electrode plate 4. Thus, the second feeder line L2 can be easily formed.

As has been described above, in the antenna device 1B, the second feeder line L2 is formed by bending the part 4*b* of the plate member constituting the second radiating electrode plate 4. This configuration achieves reduction in manufacturing costs.

1.4 Fourth Embodiment

Figure 12:
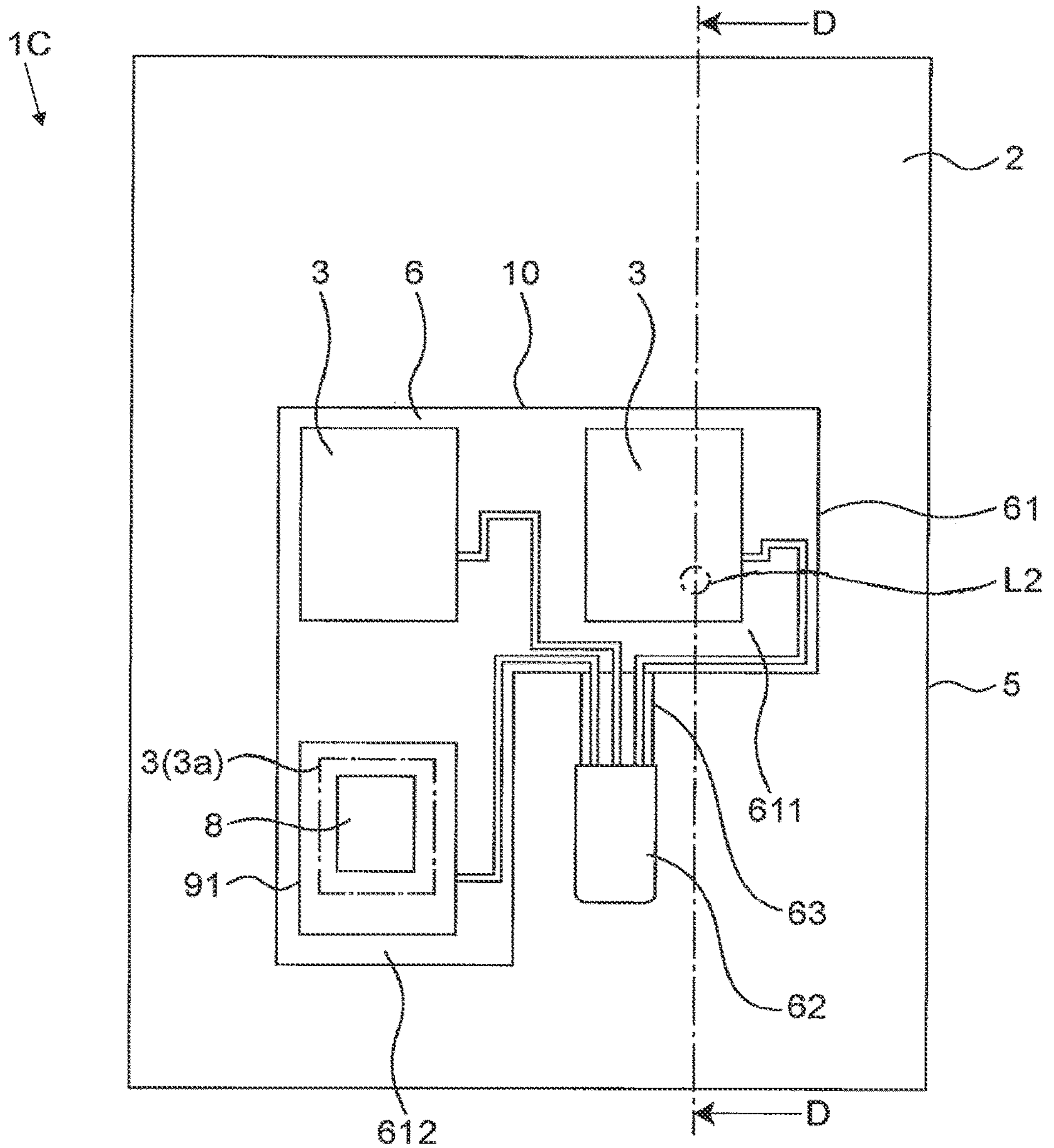
FIG. 12 is a plan view of an example of a configuration of an antenna device according to a fourth embodiment.
Figure 13:
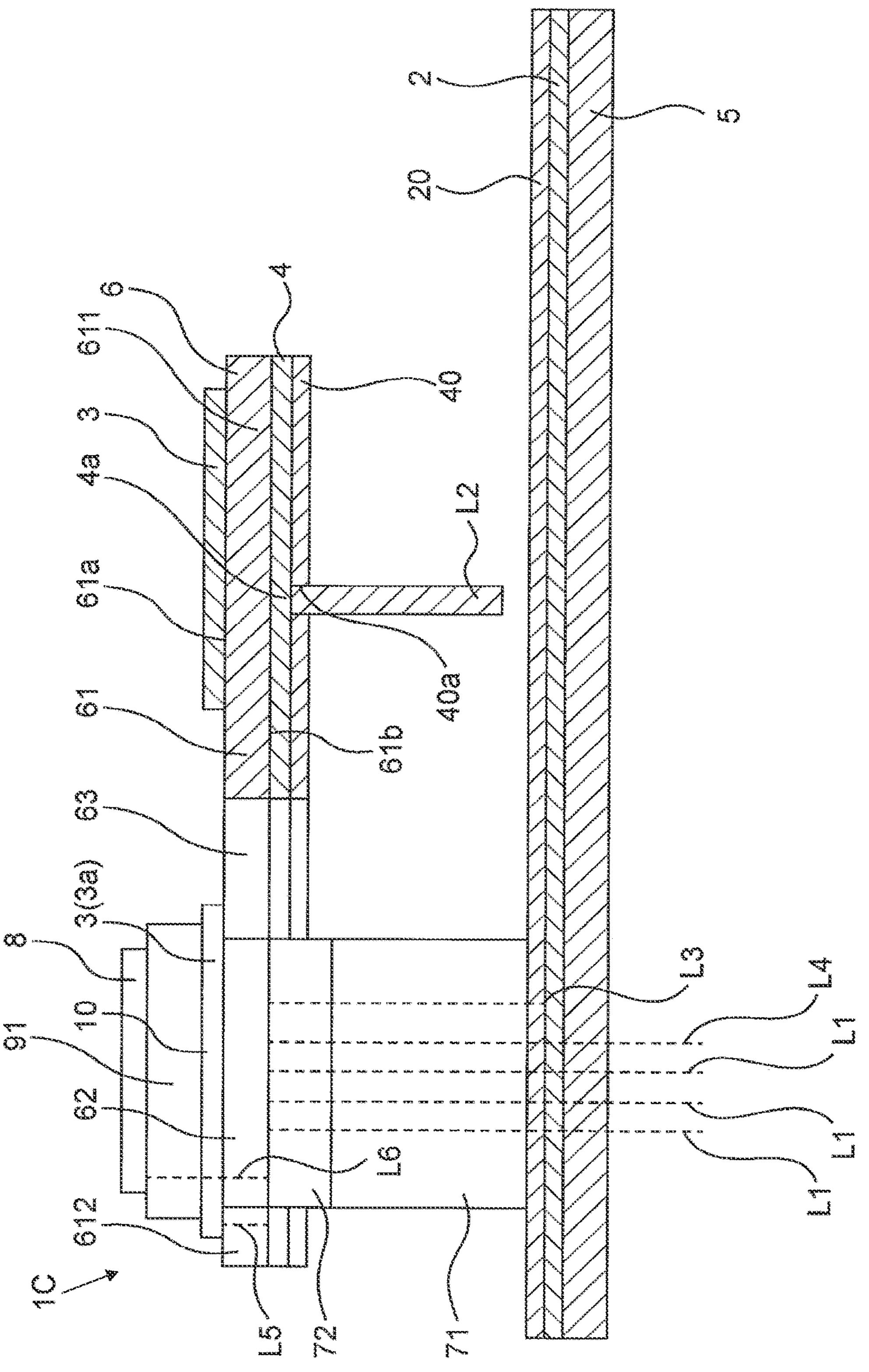
FIG. 13 is a sectional view taken along line D-D in FIG. 12.

FIGS. 12 and 13 show an example of a configuration of an antenna device 1C according to a fourth embodiment. FIG. 12 is a plan view of the antenna device 1C, and FIG. 13 is a sectional view taken along line D-D in FIG. 12.

As shown in FIGS. 12 and 13, the antenna device 1C is different from the antenna device 1 in that the antenna device 1C includes a third radiating electrode plate 8.

As shown in FIGS. 12 and 13, the third radiating electrode plate 8 faces a predetermined first radiating electrode plate 3*a*. The predetermined first radiating electrode plate 3*a* is a first radiating electrode plate 3 which is arranged in a second region 612 of a second substrate 6 of three first radiating electrode plates 3 which are arranged at the second substrate 6.

As shown in FIG. 13, the predetermined first radiating electrode plate 3*a* is connected to the second substrate 6 via a second ground line L5. The second ground line L5 is composed of, for example, a through-hole wire or the like of the second substrate 6. The predetermined first radiating electrode plate 3*a* is connected to first feeder lines L1 via first and second connectors 71 and 72.

As shown in FIG. 13, the third radiating electrode plate 8 is arranged so as to face the predetermined first radiating electrode plate 3*a*. In the present embodiment, a third substrate 91 is arranged between the third radiating electrode plate 8 and the predetermined first radiating electrode plate 3*a*. Thus, the third radiating electrode plate 8 and the predetermined first radiating electrode plate 3*a* face each other across the third substrate 91. The third radiating electrode plate 8 is connected to the second connector 72 via a feeder wire L6. The feeder wire L6 is composed of, for example, a wiring pattern of the second substrate 6 and a through-hole wire or the like of the third substrate 91. The size of the third radiating electrode plate 8 is smaller than the size of the predetermined first radiating electrode plate 3*a*. The third radiating electrode plate 8 is used in wireless communication in a frequency range higher than a frequency range for wireless communication using the predetermined first radiating electrode plate 3*a*. The frequency range for wireless communication using the predetermined first radiating electrode plate 3*a* is, for example, a frequency range of 6.5 GHz or 8 GHz, and a frequency range for wireless communication using the third radiating electrode plate 8 is, for example, a frequency range of 10 GHz. As shown in FIG. 12, the third radiating electrode plate 8 lies inside the predetermined first radiating electrode plate 3*a* as viewed from a thickness direction of a ground electrode plate 2.

As shown in FIG. 13, the antenna device 1C includes a third feeder line L4 which is not connected to the first feeder lines L1 and a second feeder line L2 but is connected to the third radiating electrode plate 8 and the second ground line L5 that connects the predetermined first radiating electrode plate 3*a* to a second radiating electrode plate 4. In the present embodiment, the first connector 71 is arranged at a first substrate 5, and is connected to the third feeder line L4 in addition to three first feeder lines L1 and the ground line L3. The third feeder line L4 is connected to the feeder wire L6 via the first and second connectors 71 and 72 and is thus connected to the third radiating electrode plate 8.

As has been described above, the antenna device 1C includes one third radiating electrode plate 8 which faces one predetermined first radiating electrode plate 3*a* of the three first radiating electrode plates 3, one third feeder line L4 which is not connected to the three first feeder lines L1 and the second feeder line L2 but is connected to one third radiating electrode plate 8, and one second ground line L5 which connects the one predetermined first radiating electrode plate 3*a* to the second radiating electrode plate 4. The one third radiating electrode plate 8 lies inside the one predetermined first radiating electrode plate 3*a* as viewed from the thickness direction of the ground electrode plate 2.

As shown in FIG. 13, in the antenna device 1C, the predetermined first radiating electrode plate 3*a* faces the second radiating electrode plate 4 and is connected to the second radiating electrode plate 4 via the second ground line L5. The first feeder lines L1 are connected to the predetermined first radiating electrode plate 3*a*. The predetermined first radiating electrode plate 3*a* and the second radiating electrode plate 4 constitute not a planar antenna but a planar inverted-F antenna (PIFA). Meanwhile, the third radiating electrode plate 8 faces the predetermined first radiating electrode plate 3*a*. The second ground line L5 does not connect the third radiating electrode plate 8 to the second radiating electrode plate 4 but connects the predetermined first radiating electrode plate 3*a* to the second radiating electrode plate 4. The predetermined first radiating electrode plate 3*a* functions as a ground for the third radiating electrode plate 8. Thus, the third radiating electrode plate 8 and the predetermined first radiating electrode plate 3*a* constitute a planar antenna (for example, a patch antenna). That is, in the antenna device 1C, the planar inverted-F antenna and the planar antenna share the predetermined first radiating electrode plate 3*a*. In other words, the predetermined first radiating electrode plate 3*a* doubles as a radiating electrode plate of the planar inverted-F antenna and a ground electrode plate of the planar antenna.

In the antenna device 1C, the planar antenna is constructed using the predetermined first radiating electrode plate 3*a* as a constituent of the planar inverted-F antenna. The third radiating electrode plate 8 that constitutes the planar antenna together with the predetermined first radiating electrode plate 3*a* lies inside the predetermined first radiating electrode plate 3*a* as viewed from the thickness direction of the ground electrode plate 2. It is thus possible to provide a planar antenna without necessarily increasing the size (planar size) of the planar inverted-F antenna composed of the predetermined first radiating electrode plate 3*a* and the second radiating electrode plate 4. As described above, the antenna device 1C according to the present embodiment allows provision of a plurality of antennas (a planar inverted-F antenna and a planar antenna) in a small space.

As has been described above, the antenna device 1C includes one or more third radiating electrode plates 8 which face one or more predetermined first radiating electrode plates 3*a* of one or more first radiating electrode plates 3, one or more third feeder lines L4 which are not connected to one or more first feeder lines L1 and the second feeder line L2 but are connected to the one or more third radiating electrode plates 8, and one or more second ground lines L5 which connect the one or more predetermined first radiating electrode plates 3*a* to the second radiating electrode plate 4. The one or more third radiating electrode plates 8 lie inside the one or more predetermined first radiating electrode plates 3*a* as viewed from the thickness direction of the ground electrode plate 2. This configuration allows provision of a plurality of antennas in a small space.

1.5 Fifth Embodiment

Figure 14:
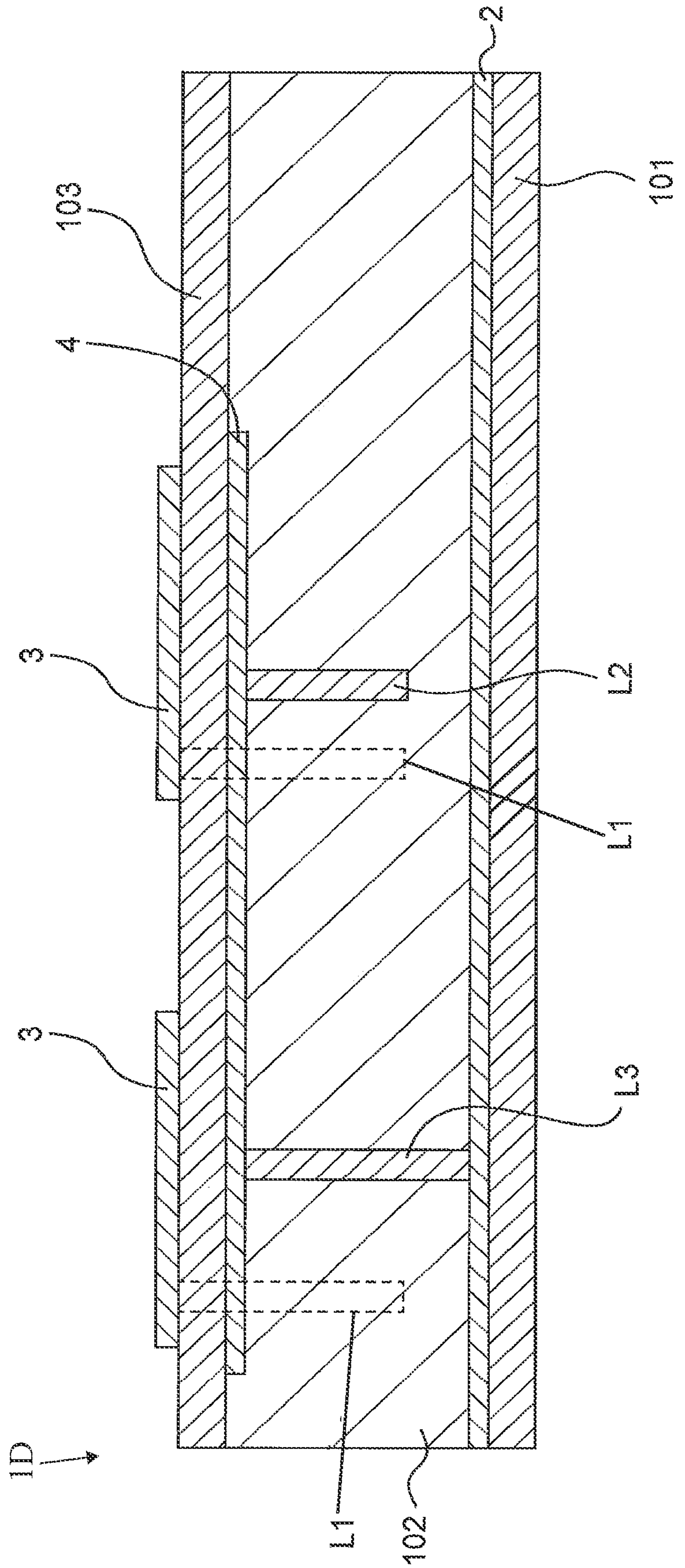
FIG. 14 is a sectional view of an example of a configuration of an antenna device according to a fifth embodiment.

FIG. 14 is a sectional view of an example of a configuration of an antenna device 1D according to a fifth embodiment. The antenna device 1D is different from the antenna device 1 in that the antenna device 1D is constructed using a multilayer substrate. Examples of the multilayer substrate include a low-temperature co-fired ceramic (LTCC) multilayer substrate, a multilayer resin substrate formed by stacking a plurality of resin layers made of resin, such as epoxy or polyimide, a multilayer resin substrate formed by stacking a plurality of resin layers made of liquid crystal polymer (LCP) having a lower dielectric constant, a multilayer resin substrate formed by stacking a plurality of resin layers made of fluorine-based resin, and a multilayer substrate made of ceramic other than LTCC.

As shown in FIG. 14, the antenna device 1D includes a ground electrode plate 2, a plurality of first radiating electrode plates 3, and a second radiating electrode plate 4, like the antenna device 1. The ground electrode plate 2, the plurality of first radiating electrode plates 3, and the second radiating electrode plate 4 are used in wireless transmission or reception.

The first radiating electrode plates 3 face the ground electrode plate 2. The second radiating electrode plate 4 lies between the ground electrode plate 2 and three first radiating electrode plates 3. That is, the ground electrode plate 2 and the three first radiating electrode plates 3 are on the opposite sides of the second radiating electrode plate 4 from each other.

Each of the first radiating electrode plates 3 constitutes a planar antenna together with the second radiating electrode plate 4. Each first radiating electrode plate 3 is, for example, a plate-like electrode. Each first radiating electrode plate 3 has, for example, a rectangular shape. The shape of the first radiating electrode plate 3 is set in accordance with a frequency range for wireless communication which uses the planar antennas composed of the first radiating electrode plates 3 and the second radiating electrode plate 4. The first radiating electrode plates 3 correspond to, for example, a frequency range for UWB-based wireless communication.

The second radiating electrode plate 4 constitutes a planar antenna together with each of the first radiating electrode plates 3. Additionally, the second radiating electrode plate 4 constitutes a planar inverted-F antenna together with the ground electrode plate 2. The second radiating electrode plate 4 is a plate-like electrode. The shape of the second radiating electrode plate 4 is set in accordance with a frequency range for wireless communication which uses the planar inverted-F antenna composed of the second radiating electrode plate 4 and the ground electrode plate 2. The second radiating electrode plate 4 corresponds to, for example, a frequency range for Wi-Fi-based wireless communication.

As shown in FIG. 14, the antenna device 1D includes a first base 101, a dielectric layer 102, and a second base 103. The ground electrode plate 2 is arranged at a surface (an upper surface in FIG. 14) on a side with the second base 103 of the first base 101. The plurality of first radiating electrode plates 3 are arranged at a surface (an upper surface in FIG. 14) on the opposite side of the second base 103 from the first base 101. The second radiating electrode plate 4 is arranged at a surface (a lower surface in FIG. 14) on a side with the first base 101 of the second base 103. The dielectric layer 102 lies between the first base 101 and the second base 103.

As shown in FIG. 14, the antenna device 1D includes a plurality of first feeder lines L1 which are connected to the plurality of first radiating electrode plates 3, a second feeder line L2 which is not connected to the plurality of first feeder lines L1 but is connected to the second radiating electrode plate 4, and a ground line L3 which does not connect the first radiating electrode plates 3 to the ground electrode plate 2 but connects the second radiating electrode plate 4 to the ground electrode plate 2. The first feeder lines L1 are, for example, vias which extend through the second base 103 and extend to a predetermined depth of the dielectric layer 102. The second feeder line L2 is, for example, a via which extends to the predetermined depth of the dielectric layer 102. The ground line L3 is, for example, a via which extends through the dielectric layer 102. The first feeder lines L1 and the second feeder line L2 are connected to an external circuit by, for example, an electrode which is provided at the dielectric layer 102.

As shown in FIG. 14, in the antenna device 1D, the second radiating electrode plate 4 faces the ground electrode plate 2 and is connected to the ground electrode plate 2 via the ground line L3, as in the antenna device 1. The second feeder line L2 is connected to the second radiating electrode plate 4. The second radiating electrode plate 4 and the ground electrode plate 2 constitute the planar inverted-F antenna (PIFA). Meanwhile, the first radiating electrode plates 3 face the second radiating electrode plate 4. The ground line L3 does not connect the first radiating electrode plates 3 to the ground electrode plate 2 but connects the second radiating electrode plate 4 to the ground electrode plate 2. The second radiating electrode plate 4 functions as a ground for the first radiating electrode plates 3. Thus, the first radiating electrode plates 3 and the second radiating electrode plate 4 constitute planar antennas (for example, patch antennas).

In the antenna device 1D, each planar antenna is constructed using the second radiating electrode plate 4 as a constituent of the planar inverted-F antenna. The first radiating electrode plates 3 that constitute the planar antennas together with the second radiating electrode plate 4 lie inside the second radiating electrode plate 4 as viewed from a thickness direction of the ground electrode plate 2. It is thus possible to provide planar antennas without necessarily increasing the size (planar size) of the planar inverted-F antenna composed of the second radiating electrode plate 4 and the ground electrode plate 2. As described above, the antenna device 1D allows provision of a plurality of antennas (a planar inverted-F antenna and planar antennas) in a small space.

2. MODIFICATIONS

Embodiments of the present disclosure are not limited to the above-described embodiments. Various changes can be made to the embodiments in accordance with the design and the like as long as the problem for the present disclosure can be solved. Modifications of the embodiments are enumerated below. The modifications to be described below can be appropriately combined and applied.

In one modification, the shapes of the constituent elements in the antenna devices 1 and 1A to 1D are not particularly limited. Each first radiating electrode plate 3 need not have a rectangular shape and may have, for example, a well-known shape available for a planar antenna. The shape of the second radiating electrode plate 4 is not limited to the shape given as an example in the embodiments. The shapes of the first radiating electrode plates 3 and the second radiating electrode plate 4 only need to satisfy the condition that the first radiating electrode plates 3 lie inside the second radiating electrode plate 4 as viewed from a thickness direction of the ground electrode plate 2. The same applies to the shapes of the third radiating electrode plate 8 and the predetermined first radiating electrode plate 3*a*.

In one modification, the number of first radiating electrode plates 3 is not particularly limited. The antenna device 1 may include, for example, one first radiating electrode plate 3. If the antenna device 1 includes a plurality of first radiating electrode plates 3, the plurality of first radiating electrode plates 3 may be arranged such that two or more first radiating electrode plates 3 are lined up in each of a first direction and a second direction which are orthogonal to a thickness direction of the ground electrode plate 2 and orthogonal to each other. In this case, an angle of arrival in each of the first direction and the second direction can be detected using the plurality of first radiating electrode plates 3.

In one modification, the number of second radiating electrode plates 4 and the number of ground electrode plates 2 are also not particularly limited.

In one modification, the shape of the protruding portion 21 is not particularly limited. The protruding portion 21 only needs to have a shape which allows adjustment of frequency characteristics of an antenna composed of the second radiating electrode plate 4 and the ground electrode plate 2. For example, the protruding portion 21 may be composed of a plurality of projections. The plurality of projections may be lined up, for example, in a length direction of the first region 611 of the electrode arrangement portion 61 of the second substrate 6.

In one modification, the first substrate 5 and the second substrate 6 need not be electrically connected by the first connector 71 and the second connector 72. The first substrate 5 and the second substrate 6 may be electrically connected by an electric wire.

In one modification, the second substrate 6 is not necessarily limited to a configuration in which the electrode arrangement portion 61 and the connector arrangement portion 62 are joined by the joining portion 63 having flexibility. The second substrate 6 may be a substrate in which the electrode arrangement portion 61 and the connector arrangement portion 62 are integrally formed, for example.

In one modification of the fourth embodiment, the number of predetermined first radiating electrode plates 3*a* is not particularly limited. In short, the antenna device 1C may include one or more third radiating electrode plates 8 which face one or more predetermined first radiating electrode plates 3*a* of one or more first radiating electrode plates 3. In this case, the antenna device 1C may include one or more third feeder lines L4 which are not connected to one or more first feeder lines L1 and the second feeder line L2 but are connected to the one or more third radiating electrode plates 8 and one or more second ground lines L5 which connect the one or more predetermined first radiating electrode plates 3*a* to the second radiating electrode plate 4. The one or more third radiating electrode plates 8 may lie inside the one or more predetermined first radiating electrode plates 3*a* as viewed from a thickness direction of the ground electrode plate 2. This allows provision of a plurality of antennas in a small space. For example, in the fourth embodiment, all of the three first radiating electrode plates 3 may be configured as predetermined first radiating electrode plates 3*a*. In one modification, the number of third radiating electrode plates 8 is not particularly limited. In the fourth embodiment, not one but a plurality of third radiating electrode plates 8 may lie inside one predetermined first radiating electrode plate 3*a* as viewed from the thickness direction of the ground electrode plate 2. That is, the one predetermined first radiating electrode plate 3*a* may be used as a ground for the plurality of third radiating electrode plates 8. In one modification of the fourth embodiment, the third substrate 91 is optional. For example, the second substrate 6 can be configured as a multilayer substrate as described in the fifth embodiment, instead of providing the third substrate 91. In this case, a dielectric layer of the second substrate 6 can be arranged between the predetermined first radiating electrode plate 3*a* and the third radiating electrode plate 8 instead of the third substrate 91. Connection of the first radiating electrode plates 3 and the third radiating electrode plate 8 to the second connector 72 can be made using an interlayer wire, such as a through-hole or a via, of the second substrate 6.

In one modification, the distance d between the end portion 41 of the second radiating electrode plate 4 and a junction (the second feed portion 4*a*) of the second feeder line L2 and the second radiating electrode plate 4 need not be ¼ of a wavelength corresponding to a highest frequency range of one or more frequency ranges used in wireless communication using the second radiating electrode plate 4, as viewed from a thickness direction of the ground electrode plate 2. The distance d may be ¼ of a wavelength corresponding to an arbitrary frequency range (that is, a frequency range whose frequency characteristics are desired to be improved) used in wireless communication using the second radiating electrode plate 4.

In one modification, the first radiating electrode plates 3 need not correspond to a frequency range for UWB-based wireless communication. The second radiating electrode plate 4 need not correspond to a frequency range for Wi-Fi-based wireless communication. A frequency range for wireless communication using the first radiating electrode plates 3 or the second radiating electrode plate 4 may be selected from well-known frequency ranges, such as a mid band in a 2G (second-generation mobile communication) standard, a low band in a 4G (fourth-generation mobile communication) standard, and a low band in a 5G (fifth-generation mobile communication) standard. The 2G standard is, for example, the GSM® standard (Global System for Mobile Communications (GSM)). The 4G standard is, for example, the 3GPP LTE standard (long term evolution (LTE)). The 5G standard is, for example, 5G new radio (NR). The frequency range for wireless communication using the first radiating electrode plates 3 or the second radiating electrode plate 4 may be selected from frequency ranges used in various communication standards for Bluetooth®, a wireless LAN, specified low power radio, and near field communication.

In one modification, a first feed portion and a ground portion need not be composed of the second connector 72. The first feed portion may be an electrode pad which is provided at the second substrate 6 for connection to the first radiating electrode plates 3. The ground portion may be an electrode pad which is provided at the second substrate 6 for grounding of the second radiating electrode plate 4.

3. ASPECTS

As can be seen from the above-described embodiments and modifications, the present disclosure includes the following aspects. Reference characters in parentheses will be assigned below for clarification of correspondence relationships with the embodiments.

A first aspect is an antenna device (1; 1A to 1D), including a ground electrode plate (2), one or more first radiating electrode plates (3) which face the ground electrode plate (2), a second radiating electrode plate (4) which lies between the ground electrode plate (2) and the one or more first radiating electrode plates (3), one or more first feeder lines (L1) which are connected to the one or more first radiating electrode plates (3), a second feeder line (L2) which is not connected to the one or more first feeder lines (L1) but is connected to the second radiating electrode plate (4), and a ground line (L3) which does not connect the one or more first radiating electrode plates (3) to the ground electrode plate (2) but connects the second radiating electrode plate (4) to the ground electrode plate (2). The one or more first radiating electrode plates (3) lie inside the second radiating electrode plate (4) as viewed from a thickness direction of the ground electrode plate (2). This aspect allows provision of a plurality of antennas in a small space.

A second aspect is an antenna device (1A) according to the first aspect. In the second aspect, the antenna device (1A) includes a protruding portion (21) which extends from the ground electrode plate (2) toward the second radiating electrode plate (4). According to this aspect, the protruding portion (21) makes it possible to adjust a resonant frequency of an antenna composed of the second radiating electrode plate (4) and the ground electrode plate (2) without necessarily affecting frequency characteristics of an antenna composed of the one or more first radiating electrode plates (3) and the second radiating electrode plate (4).

A third aspect is an antenna device (1A) according to the second aspect. In the third aspect, the protruding portion (21) lies on an opposite side of a junction (the second feed portion 4*a*) of the second feeder line (L2) and the second radiating electrode plate (4) from a junction (the second connector 72) of the ground line (L3) and the second radiating electrode plate (4) as viewed from the thickness direction of the ground electrode plate (2). According to this aspect, the protruding portion (21) makes it possible to adjust the resonant frequency of the antenna composed of the second radiating electrode plate (4) and the ground electrode plate (2) without necessarily affecting the frequency characteristics of the antenna composed of the one or more first radiating electrode plates (3) and the second radiating electrode plate (4).

A fourth aspect is an antenna device (1; 1A to 1C) according to any one of the first to third aspects. In the fourth aspect, the antenna device (1; 1A to 1C) includes a first substrate (5) at which the ground electrode plate (2) is arranged and a second substrate (6) which is arranged spaced apart from the first substrate (5) and at which the one or more first radiating electrode plates (3) and the second radiating electrode plate (4) are arranged. This aspect allows provision of a plurality of antennas in a small space.

A fifth aspect is an antenna device (1; 1A to 1C) according to the fourth aspect. In the fifth aspect, the one or more first radiating electrode plates (3) are arranged at a surface on an opposite side of the second substrate (6) from the first substrate (5). The second radiating electrode plate (4) is arranged at a surface on a side with the first substrate (5) of the second substrate (6). This aspect allows provision of a plurality of antennas in a small space.

A sixth aspect is an antenna device (1; 1A to 1C) according to the fourth or fifth aspect. In the sixth aspect, the antenna device (1; 1A to 1C) includes a first connector (71) and a second connector (72) that are removably connected to each other. The first connector (71) is arranged at the first substrate (5) and is connected to the one or more first feeder lines (L1) and the ground line (L3). The second connector (72) is arranged at the second substrate (6) and is connected to the one or more first radiating electrode plates (3) and the second radiating electrode plate (4). According to this aspect, with the connection of the first connector (71) to the second connector (72), the one or more first feeder lines (L1) are connected to the one or more first radiating electrode plates (3), and the ground line (L3) is connected to the second radiating electrode plate (4). This facilitates assembly of the antenna device (1; 1A to 1C).

A seventh aspect is an antenna device (1; 1A to 1C) according to the sixth aspect. In the seventh aspect, the second substrate (6) has an electrode arrangement portion (61), in which the one or more first radiating electrode plates (3) and the second radiating electrode plate (4) are arranged, a connector arrangement portion (62), in which the second connector (72) is arranged, and a flexible joining portion (63) that joins the electrode arrangement portion (61) and the connector arrangement portion (62). This aspect facilitates assembly of the antenna device (1; 1A to 1C).

An eighth aspect is an antenna device (1; 1A to 1C) according to the seventh aspect. In the eighth aspect, the electrode arrangement portion (61) includes a first region (611), in which at least two first radiating electrode plates (3) are arranged, and a second region (612), which protrudes from the first region (611) in a direction crossing a direction in which the at least two first radiating electrode plates (3) arranged in the first region (611) are lined up and in which at least one first radiating electrode plate (3) is arranged. The connector arrangement portion (62) is lined up with the second region (612) in the direction in which the at least two first radiating electrode plates (3) arranged in the first region (611) are lined up. The joining portion (63) joins the connector arrangement portion (62) and the first region (611). This aspect makes it possible to reduce the size of the second substrate (6) while providing a plurality of first radiating electrode plates (3).

A ninth aspect is an antenna device (1B) according to any one of the fourth to eighth aspects. In the ninth aspect, the second feeder line (L2) is continuous and integral with the second radiating electrode plate (4). This aspect achieves reduction in manufacturing costs.

A tenth aspect is an antenna device (1C) according to any one of the first to eighth aspects. In the tenth aspect, the antenna device (1C) includes a third radiating electrode plate (8) which faces a predetermined first radiating electrode plate (3*a*) of the one or more first radiating electrode plates (3), a third feeder line (L4) which is not connected to the one or more first feeder lines (L1) and the second feeder line (L2) but is connected to the third radiating electrode plate (8), and a second ground line (L5) which connects the predetermined first radiating electrode plate (3*a*) to the second radiating electrode plate (4). The third radiating electrode plate (8) lies inside the predetermined first radiating electrode plate (3*a*) as viewed from the thickness direction of the ground electrode plate (2). This aspect allows provision of a plurality of antennas in a small space.

An eleventh aspect is an antenna device (1; 1A to 1C) according to any one of the first to tenth aspects. In the eleventh aspect, the second radiating electrode plate (4) has an end portion (41) on an opposite side of a junction (the second feed portion 4*a*) of the second feeder line (L2) and the second radiating electrode plate (4) from a junction of the ground line (L3) and the second radiating electrode plate (4), as viewed from the thickness direction of the ground electrode plate (2). As viewed from the thickness direction of the ground electrode plate (2), a distance (d) between the end portion (41) and the junction (the second feed portion 4*a*) of the second feeder line (L2) and the second radiating electrode plate (4) is ¼ of a wavelength corresponding to a highest frequency range of one or more frequency ranges used in wireless communication using the second radiating electrode plate (4). This aspect allows improvement of characteristics for a highest frequency range of one or more frequency ranges used in wireless communication using the second radiating electrode plate 4.

A twelfth aspect is an antenna device (1; 1A to 1D) according to any one of the first to eleventh aspects. In the twelfth aspect, the one or more first radiating electrode plates (3) include a plurality of first radiating electrode plates (3), two or more of which are lined up in each of a first direction and a second direction which are orthogonal to the thickness direction of the ground electrode plate (2) and orthogonal to each other. This aspect allows detection of an angle of arrival in each of the first direction and the second direction.

A thirteenth aspect is an antenna device (1; 1A to 1D) according to the twelfth aspect. In the thirteenth aspect, the one or more first radiating electrode plates (3) include three first radiating electrode plates (3) which are lined up in an L-shape as viewed from the thickness direction of the ground electrode plate (2). This aspect allows detection of an angle of arrival in each of the first direction and the second direction and achieves reduction in size and reduction in manufacturing costs.

A fourteenth aspect is an antenna device (1; 1A to 1D) according to any one of the first to thirteenth aspects. In the fourteenth aspect, the one or more first radiating electrode plates (3) correspond to a frequency range for UWB-based wireless communication. The second radiating electrode plate (4) corresponds to a frequency range for Wi-Fi-based wireless communication. This aspect allows both UWB-based wireless communication and Wi-Fi-based wireless communication.

A fifteenth aspect is an antenna unit, including one or more first radiating electrode plates (3), a second radiating electrode plate (4) which faces the one or more first radiating electrode plates (3), a first feed portion (72) for connecting one or more first feeder lines (L1) to the one or more first radiating electrode plates (3), a second feed portion (4*a*) for connecting a second feeder line (L2) to the second radiating electrode plate (4), and a ground portion (72) for connecting a ground to the second radiating electrode plate (4). The one or more first radiating electrode plates (3) lie inside the second radiating electrode plate (4) as viewed from a direction in which the one or more first radiating electrode plates (3) and the second radiating electrode plate (4) face. This aspect allows provision of a plurality of antennas in a small space.

The present disclosure is applicable to an antenna device and an antenna unit. Specifically, the present disclosure is applicable to an antenna device including a plurality of antennas and an antenna unit used to construct the antenna device.

REFERENCE SIGNS LIST

- 1, 1A to 1D antenna device
- 10 antenna unit
- 2 ground electrode plate
- 21 protruding portion
- 3 first radiating electrode plate
- 3*a* predetermined first radiating electrode plate
- 4 second radiating electrode plate
- 4*a* second feed portion (junction)
- 4*b* part
- 41 end portion
- 5 first substrate
- 6 second substrate
- 61 electrode arrangement portion
- 611 first region
- 612 second region
- 62 connector arrangement portion 63 joining portion
71 first connector
72 second connector (first feed portion, ground portion (junction))
8 third radiating electrode plate
L1 first feeder line
L2 second feeder line
L3 ground line
L4 third feeder line
L5 second ground line
L6 feeder wire

The invention claimed is:

1. An antenna device comprising:
a ground electrode plate;
one or more first radiating electrode plates which face the ground electrode plate;
a second radiating electrode plate between the ground electrode plate and the one or more first radiating electrode plates;
one or more first feeder lines connected to the one or more first radiating electrode plates;
a second feeder line which is not connected to the one or more first feeder lines, and which is connected to the second radiating electrode plate;
a ground line which does not connect the one or more first radiating electrode plates to the ground electrode plate, and which does connect the second radiating electrode plate to the ground electrode plate; and
a protruding portion which extends from the ground electrode plate toward the second radiating electrode plate,
wherein the one or more first radiating electrode plates are inside a region defined by a perimeter of the second radiating electrode plate as viewed in a plan view in a thickness direction of the ground electrode plate, and
wherein the protruding portion is on an opposite side of a junction of the second feeder line and the second radiating electrode plate from a junction of the ground line and the second radiating electrode plate, as viewed in the plan view.

2. The antenna device according to claim 1, further comprising:
a first substrate, the ground electrode plate being on the first substrate; and
a second substrate which is spaced apart from the first substrate, the one or more first radiating electrode plates and the second radiating electrode plate being on the second substrate.

3. The antenna device according to claim 2,
wherein the second radiating electrode plates are on a surface of the second substrate that faces the first substrate, and
wherein the one or more first radiating electrode plates are on a surface of the second substrate that is opposite the second radiating electrode plates.

4. The antenna device according to claim 2, further comprising:
a first connector and a second connector which are removably connected to each other,
wherein the first connector is on the first substrate and is connected to the one or more first feeder lines and the ground line, and
wherein the second connector is on the second substrate and is connected to the one or more first radiating electrode plates and to the second radiating electrode plate.

5. The antenna device according to claim 4, wherein the second substrate has:
an electrode arrangement portion in which the one or more first radiating electrode plates and the second radiating electrode plate are arranged,
a connector arrangement portion in which the second connector is arranged, and
a flexible joining portion which joins the electrode arrangement portion and the connector arrangement portion.

6. The antenna device according to claim 5,
wherein the electrode arrangement portion includes a first region in which at least two of the one or more first radiating electrode plates are arranged in a first region direction, and a second region which protrudes from the first region in a protrusion direction that intersects the first region direction and in which at least one of the one or more first radiating electrode plates is arranged,
wherein the connector arrangement portion and the second region are arranged in an arrangement direction that is parallel with the first region direction, and
wherein the joining flexible portion joins the connector arrangement portion and the first region.

7. The antenna device according to claim 2, wherein the second feeder line is continuous and integral with the second radiating electrode plate.

8. The antenna device according to claim 1, further comprising:
a third radiating electrode plate which faces a predetermined first radiating electrode plate of the one or more first radiating electrode plates;
a third feeder line which is not connected to the one or more first feeder lines and the second feeder line, and which is connected to the third radiating electrode plate; and
a second ground line which connects the predetermined first radiating electrode plate to the second radiating electrode plate,
wherein the third radiating electrode plate is in a region defined by a perimeter of the predetermined first radiating electrode plate as viewed in the plan view.

9. The antenna device according to claim 1,
wherein the second radiating electrode plate has an end portion on an opposite side of a junction of the second feeder line and the second radiating electrode plate from a junction of the ground line and the second radiating electrode plate, as viewed in the plan view, and
wherein a distance between the end portion and the junction of the second feeder line and the second radiating electrode plate is ¼ of a wavelength corresponding to a highest frequency range of wireless communication using the second radiating electrode plate, as viewed in the plan view.

10. The antenna device according to claim 1, wherein the one or more first radiating electrode plates include a plurality of first radiating electrode plates, two or more of which are in each of a first direction and a second direction which are orthogonal to the thickness direction of the ground electrode plate and orthogonal to each other.

11. The antenna device according to claim 10, wherein the one or more first radiating electrode plates include three first radiating electrode plates which are arranged in an L-shape as viewed in the plan view.

12. The antenna device according to claim 1, wherein the one or more first radiating electrode plates correspond to a frequency range for UWB-based wireless communication, and wherein the second radiating electrode plate corresponds to a frequency range for Wi-Fi-based wireless communication.

13. An antenna unit comprising:

one or more first radiating electrode plates;

a second radiating electrode plate which faces the one or more first radiating electrode plates;

a first feed portion which connects one or more first feeder lines to the one or more first radiating electrode plates;

a second feed portion which connects a second feeder line to the second radiating electrode plate; and a ground portion which connects a ground line to the second radiating electrode plate, wherein the one or more first radiating electrode plates are inside a region defined by a perimeter of the second radiating electrode plate, as viewed from a plan view in a direction in which the one or more first radiating electrode plates and the second radiating electrode plate face, wherein the antenna unit is configured to be connected to a first substrate comprising a ground electrode plate and a protruding portion which extends from the ground electrode plate toward the second radiating electrode plate, and wherein the protruding portion is on an opposite side of a junction of the second feeder line and the second radiating electrode plate from a junction of the ground line and the second radiating electrode plate, as viewed in the plan view.

* * * * *